United States Patent
Liou et al.

(10) Patent No.: US 9,598,538 B2
(45) Date of Patent: Mar. 21, 2017

(54) TRANSPARENT ELECTROCHROMIC POLYMER AND ELECTROCHROMIC DEVICE

(71) Applicant: INDUSTRIAL TECHNOLOGY RESEARCH INSTITUTE, Hsinchu (TW)

(72) Inventors: Guey-Sheng Liou, Puli Township (TW); Hung-Ju Yen, New Taipei (TW); Ya-Wen Chuang, Taoyuan (TW); Yu-Ruei Kung, New Taipei (TW); Chyi-Ming Leu, Jhudong Township (TW); Li-Ting Huang, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 267 days.

(21) Appl. No.: 14/631,542

(22) Filed: Feb. 25, 2015

(65) Prior Publication Data
US 2015/0241752 A1 Aug. 27, 2015

(30) Foreign Application Priority Data
Feb. 27, 2014 (TW) ............... 103106702 A

(51) Int. Cl.
*G02F 1/15* (2006.01)
*C08G 65/08* (2006.01)
(Continued)

(52) U.S. Cl.
CPC ......... *C08G 73/026* (2013.01); *C08G 73/024* (2013.01); *C08G 73/0266* (2013.01);
(Continued)

(58) Field of Classification Search
CPC .. G02F 1/15; G02F 1/1508; G02F 2001/1515; B32B 17/10513; B60R 1/088;
(Continued)

(56) References Cited

U.S. PATENT DOCUMENTS 5,068,062 A 11/1991 Inata et al.
5,177,056 A 1/1993 Hilti et al.
(Continued)

OTHER PUBLICATIONS

Ya-Wen Chuang, Hung-Ju Yen and Guey-Sheng Liou. A facile approach to multicolored electrochromic triarylamine-based thermoset epoxy materials with tunable intervalence charge transfer behavior. Chem. Commun., 2013, 49, 9812-9814. Aug. 30, 2013.*
(Continued)

*Primary Examiner* — Bumsuk Won
*Assistant Examiner* — Collin X Beatty
(74) *Attorney, Agent, or Firm* — Birch, Stewart, Kolasch & Birch, LLP

(57) ABSTRACT

A transparent electrochromic polymer is provided, which is polymerized of 1 molar part of a diamine and 1 to 4 molar parts of epoxy compound. The diamine is Formula 1, Formula 2, or combinations thereof, and the epoxy compound is Formula 12, Formula 13, or combinations thereof. The disclosed also provides an electrochromic device, including a first transparent conductive layer, an electrochromic layer on the first transparent conductive layer, and an electrolyte layer on the electrolyte layer, wherein the electrochromic layer is the transparent electrochromic polymer, and a second transparent conductive layer on the electrolyte layer.

(Continued)

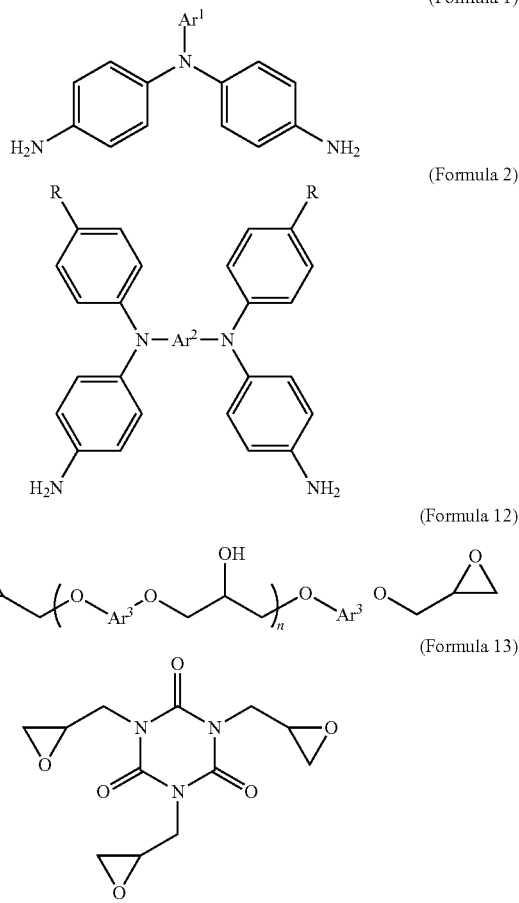

(51) Int. Cl.
| | |
|---|---|
| C08G 65/14 | (2006.01) |
| C08G 65/00 | (2006.01) |
| C08G 59/44 | (2006.01) |
| C08G 59/50 | (2006.01) |
| C08G 73/00 | (2006.01) |
| C08G 73/02 | (2006.01) |
| C09K 9/02 | (2006.01) |
| C09K 9/00 | (2006.01) |

(52) U.S. Cl.
CPC .............. *C09K 9/00* (2013.01); *C09K 9/02* (2013.01); *G02F 1/15* (2013.01); *C09K 2211/1059* (2013.01); *C09K 2211/1466* (2013.01); *G02F 1/1508* (2013.01); *G02F 2001/1515* (2013.01)

(58) Field of Classification Search
CPC ... C08L 65/00; H01M 6/181; H01M 10/0565; C08G 61/122; C08G 73/026; C08G 73/0266; C08G 2261/1424; C08G 73/024; C08J 5/2231; H01G 11/56; C09K 9/00; C09K 9/02
USPC .............. 359/265; 252/500, 586, 582, 511; 528/98, 123, 367; 549/60; 429/314
See application file for complete search history.

(56) References Cited

U.S. PATENT DOCUMENTS

| | | |
|---|---|---|
| 5,482,655 A | 1/1996 | Vogel et al. |
| 5,724,187 A | 3/1998 | Varaprasad et al. |
| 7,004,592 B2 | 2/2006 | Varaprasad et al. |
| 7,494,231 B2 | 2/2009 | Varaprasad et al. |
| 7,543,947 B2 | 6/2009 | Varaprasad et al. |
| 7,572,017 B2 | 8/2009 | Varaprasad et al. |
| 7,582,390 B2 | 9/2009 | Takizawa |
| 7,771,061 B2 | 8/2010 | Varaprasad et al. |
| 7,871,169 B2 | 1/2011 | Varaprasad et al. |
| 8,511,841 B2 | 8/2013 | Varaprasad et al. |
| 2002/0041443 A1 | 4/2002 | Varaprasad et al. |
| 2005/0083577 A1 | 4/2005 | Varaprasad et al. |
| 2006/0028730 A1 | 2/2006 | Varaprasad et al. |
| 2007/0183066 A1 | 8/2007 | Varaprasad et al. |
| 2008/0094684 A1 | 4/2008 | Varaprasad et al. |
| 2008/0180781 A1 | 7/2008 | Varaprasad et al. |
| 2009/0067032 A1 | 3/2009 | Varaprasad et al. |
| 2009/0221763 A1 | 9/2009 | Reynolds et al. |
| 2010/0129524 A1 | 5/2010 | Sternberger et al. |
| 2011/0128137 A1 | 6/2011 | Varaprasad et al. |
| 2011/0217547 A1 | 9/2011 | Mather et al. |
| 2014/0146380 A1 | 5/2014 | Kung et al. |

OTHER PUBLICATIONS

Kung et al., "Fluorescent and electrochromic polyamides with pyrenylamine chromophore," Journal of Materials Chemistry, vol. 20, 2010 (First published as an Advance Article on the web May 26, 2010), pp. 5481-5492.

Taiwanese Notice of Allowance for Taiwanese Application No. 103106702, dated Apr. 14, 2015.

\* cited by examiner

12 Claims, 11 Drawing Sheets

TRANSPARENT ELECTROCHROMIC POLYMER AND ELECTROCHROMIC DEVICE

CROSS REFERENCE TO RELATED APPLICATIONS

The present application is based on, and claims priority from, Taiwan Application Serial Number 103106702, filed on Feb. 27, 2014, the disclosure of which is hereby incorporated by reference herein in its entirety.

TECHNICAL FIELD

The technical field relates to a transparent polymer, and in particular it relates to its application of an electrochromic device.

BACKGROUND

Electrochromic devices are attractive in green energy industries due to their low driving voltage and bistable properties. A major electrochromic material is inorganic oxide for longer lifetime and endurance, however, film thereof is prepared by using expensive processes and equipment such as vacuum deposition, spray pyrolysis, or sputtering. Even ignoring the cost of processing, the inorganic oxide still has shortcomings such as a slow electrochromic rate, less color variation, and the like. Most electrochromic organic materials use conjugated polymer with more color variation and fast electrochromic rates. However, the electrochromic conjugated polymer has shortcomings such as expensive monomers, a complicated synthesis, and formation by electro-polymerization. Therefore, the conjugated polymer with a low molecular weight has a size limited by the electrode size of the electro-polymerization. In other words, it is difficult to form an organic electrochromic material with a large area. On the other hand, the electrochromic conjugated polymer has an appearance of deep color due to its conjugated length. Although the deep color can be lightened by applying a voltage, the conjugated polymer cannot be fully transparent. In other words, the conjugated polymer must be electrified to effect a transparent state, thereby leading to the problem of high energy consumption.

Accordingly, a novel electrochromic organic material to meet the requirements of transparency, film-firming ability, and electrochromicity is called-for.

SUMMARY

One embodiment of the disclosure provides a transparent electrochromic polymer, being polymerized of 1 molar part of a diamine and 1 to 4 molar parts of an epoxy compound, wherein the diamine is Formula 1, Formula 2, or a combination thereof:

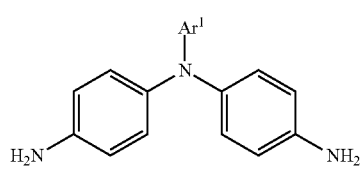
(Formula 1)

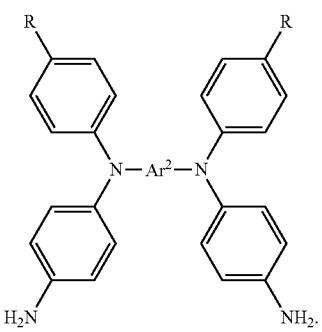
(Formula 2)

$Ar^1$ is Formula 3, Formula 4, Formula 5, Formula 6, Formula 7, or Formula 8:

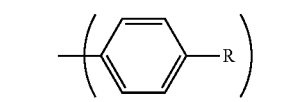
(Formula 3)

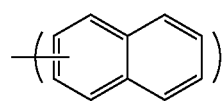
(Formula 4)

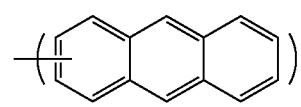
(Formula 5)

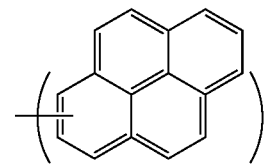
(Formula 6)

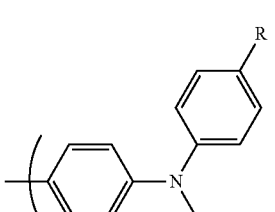
(Formula 7)

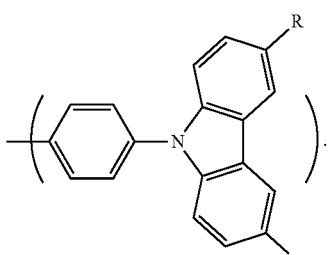
(Formula 8)

R is —H, —F, —Br, —Cl, —I, —CH$_3$, —C$_2$H$_5$, —C$_3$H$_7$, -n-C$_4$H$_9$, -s-C$_4$H$_9$, -t-C$_4$H$_9$, —C$_5$H$_{11}$, —C$_6$H$_{13}$, —C$_7$H$_{15}$, —OCH$_3$, —OC$_2$H$_5$, —OC$_3$H$_7$, -n-OC$_4$H$_9$, -s-OC$_4$H$_9$,

-t-OC$_4$H$_9$, —OC$_5$H$_{11}$, —OC$_6$H$_{13}$, or —OC$_7$H$_{15}$. Ar$^2$ is Formula 9, Formula 10, or Formula 11:

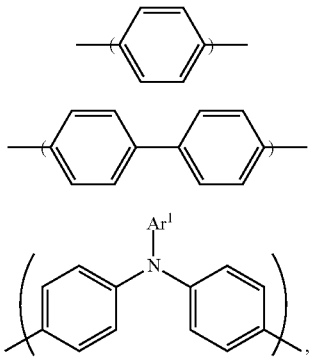

(Formula 9)

(Formula 10)

(Formula 11)

wherein the epoxy compound is Formula 12, Formula 13, or a combination thereof:

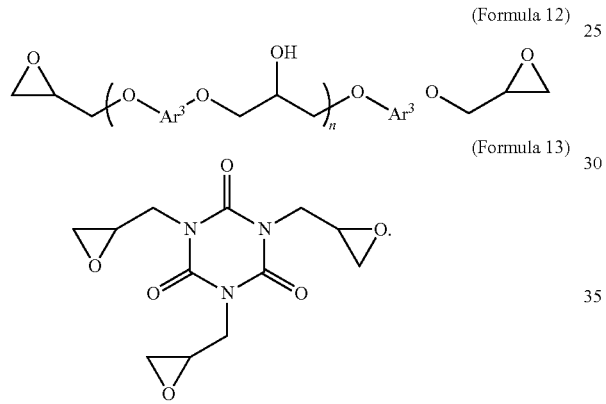

(Formula 12)

(Formula 13)

n is between 0 to 100, and Ar$^3$ is Formula 9, Formula 14, Formula 15, Formula 16, Formula 17, Formula 18, Formula 19, Formula 20, Formula 21, or Formula 22:

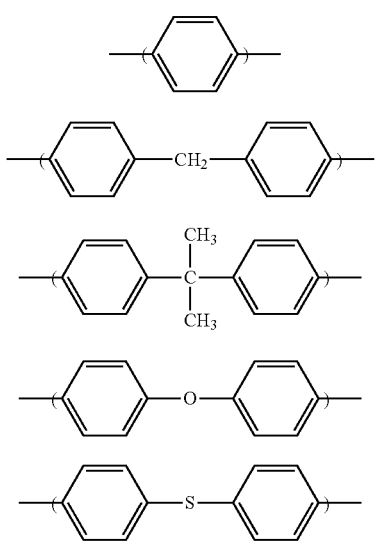

(Formula 9)

(Formula 14)

(Formula 15)

(Formula 16)

(Formula 17)

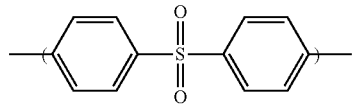

(Formula 18)

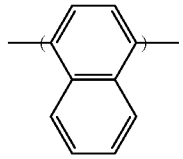

(Formula 19)

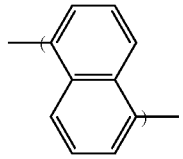

(Formula 20)

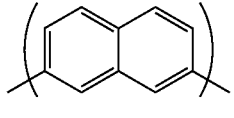

(Formula 21)

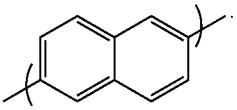

(Formula 22)

One embodiment of the disclosure provides an electrochromic device, comprising: a first transparent conductive layer; a layer of the described transparent electrochromic polymer disposed on the first conductive layer; an electrolyte layer disposed on the layer of the described transparent electrochromic polymer; and a second transparent conductive layer disposed on the electrolyte layer.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
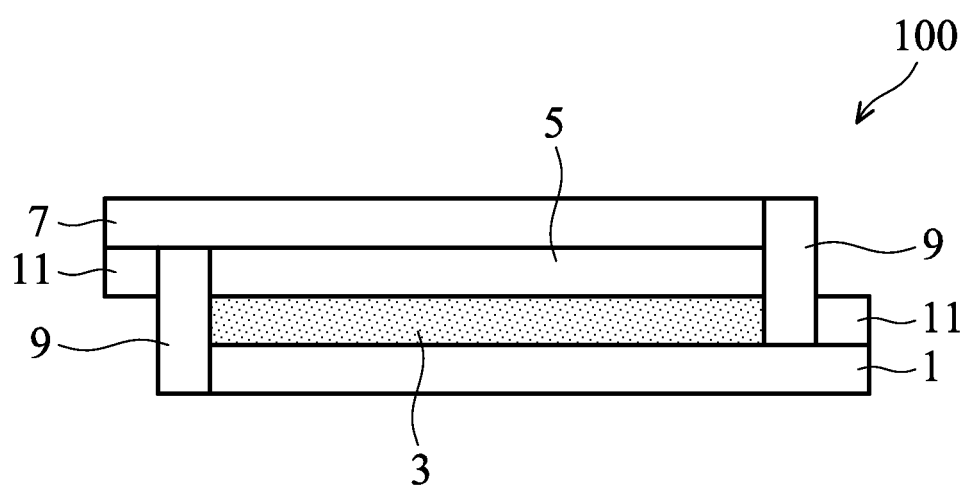
FIG. 1 shows an electrochromic device in one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

In some embodiments, the transparent electrochromic polymer is polymerized of 1 molar part of a diamine and 1 to 4 molar parts of an epoxy compound. An overly high ratio of the epoxy compound may lower the color change contrast of the electrochromic polymer at oxidation state. An overly low ratio of the epoxy compound may decrease the electrochromic oxidation active sites, such that the multicolor change effect may fail. The diamine is Formula 1, Formula 2, or a combination thereof:

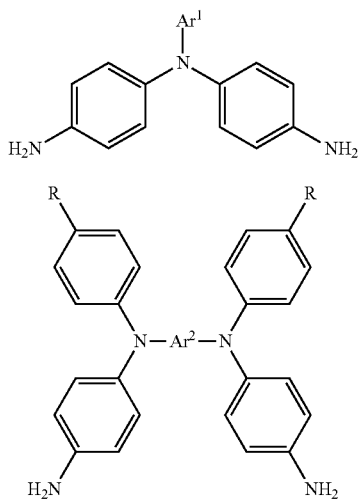
(Formula 1)

(Formula 2)

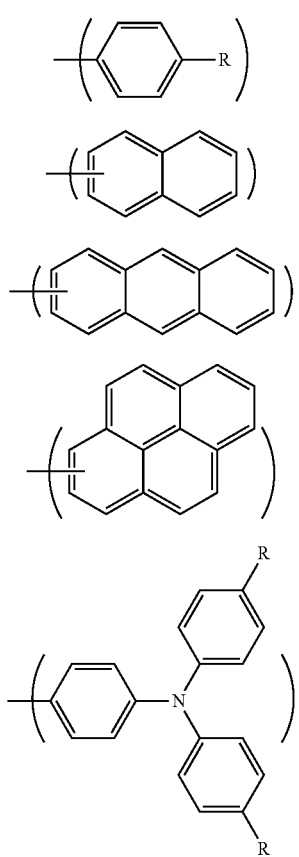

In Formula 1, $Ar^{1i}$ is Formula 3, Formula 4, Formula 5, Formula 6, Formula 7, or Formula 8:

(Formula 3)

(Formula 4)

(Formula 5)

(Formula 6)

(Formula 7)

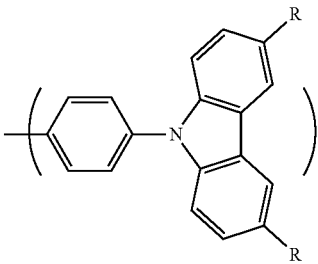
(Formula 8)

In Formula 3, Formula 7, and Formula 8, R is —H, —F, —Br, —Cl, —I, —CH$_3$, —C$_2$H$_5$, —C$_3$H7, -n-C$_4$H$_9$, -s-C$_4$H$_9$, -t-C$_4$H$_9$, —C$_5$H$_{11}$, —C$_6$H$_{13}$, —C$_7$H$_{15}$, —OCH$_3$, —OC$_2$H$_5$, —OC$_3$H$_7$, -n-OC$_4$H$_9$, s-OC$_4$H$_9$, -t-OC$_4$H$_9$, —OC$_5$H$_{11}$, —OC$_6$H$_{13}$, or —OC$_7$H$_{15}$.

In Formula 2, $Ar^2$ is Formula 9, Formula 10, or Formula 11. In Formula 11, the $Ar^1$ is similar to the above definition and the description thereof is omitted here for simplification.

(Formula 9)

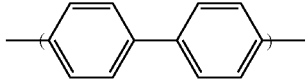
(Formula 10)

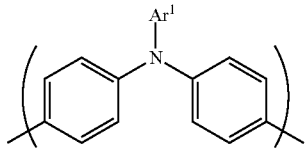
(Formula 11)

The epoxy compound is Formula 12, Formula 13, or a combination thereof:

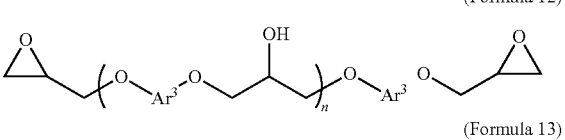
(Formula 12)

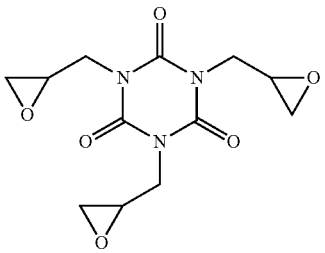
(Formula 13)

In Formula 12, n is between 0 to 100, and $Ar^3$ is Formula 9, Formula 14, Formula 15, Formula 16, Formula 17, Formula 18, Formula 19, Formula 20, Formula 21, or Formula 22. An overly large n may lower the color change contrast of the electrochromic polymer at oxidation state. An overly small n not only results a poor film-forming ability of the polymer, but also decrease the electrochromic oxidation active sites, such that the multicolor change effect may fail.

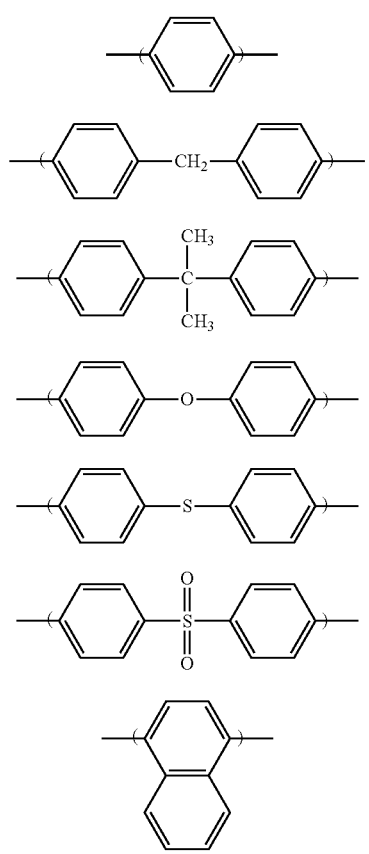

(Formula 9)

(Formula 14)

(Formula 15)

(Formula 16)

(Formula 17)

(Formula 18)

(Formula 19)

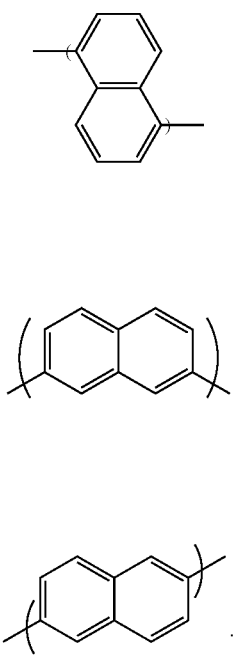

(Formula 20)

(Formula 21)

(Formula 22)

In one embodiment, the diamine and the epoxy compound are mixed in a solvent and heated, such that the amino group of the diamine and the epoxy group of the epoxy compound are reacted through a ring-opening reaction. As such, the diamine and the epoxy compound are polymerized to form a transparent electrochromic polymer as per Formula 23, Formula 24, Formula 25, or Formula 26.

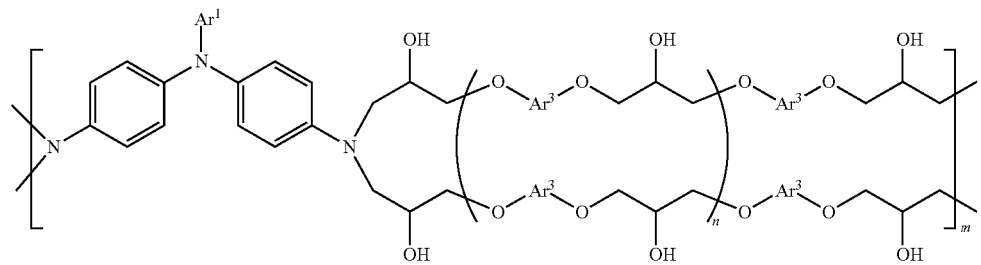

(Formula 23)

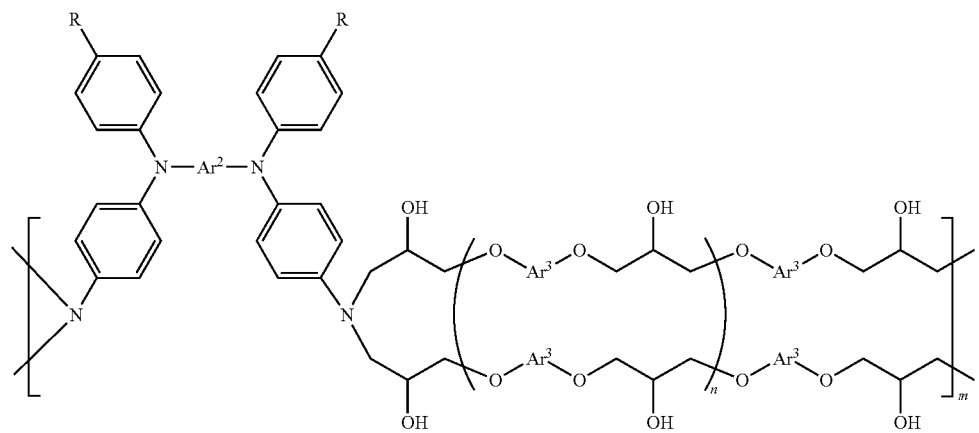

(Formula 24)

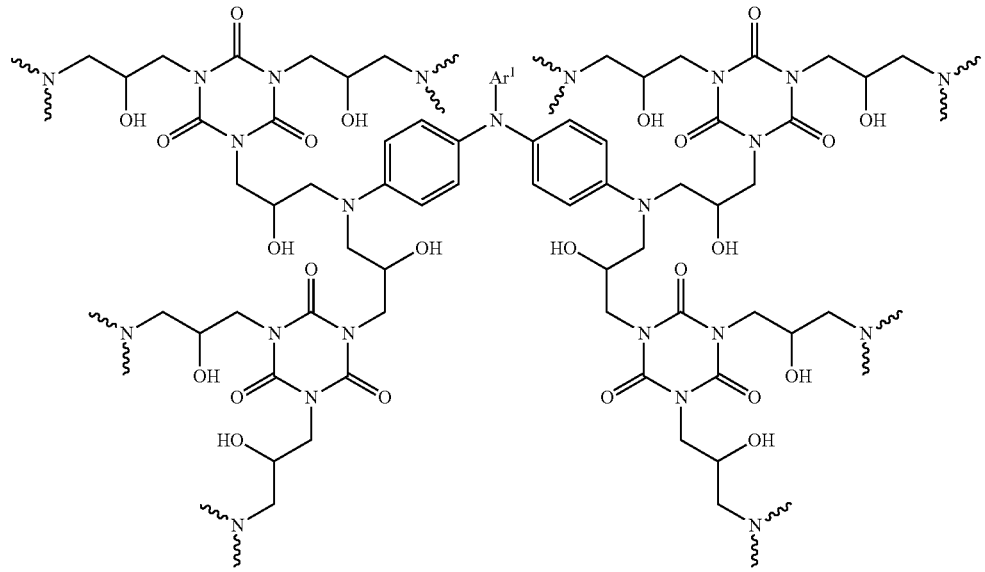

(Formula 25)

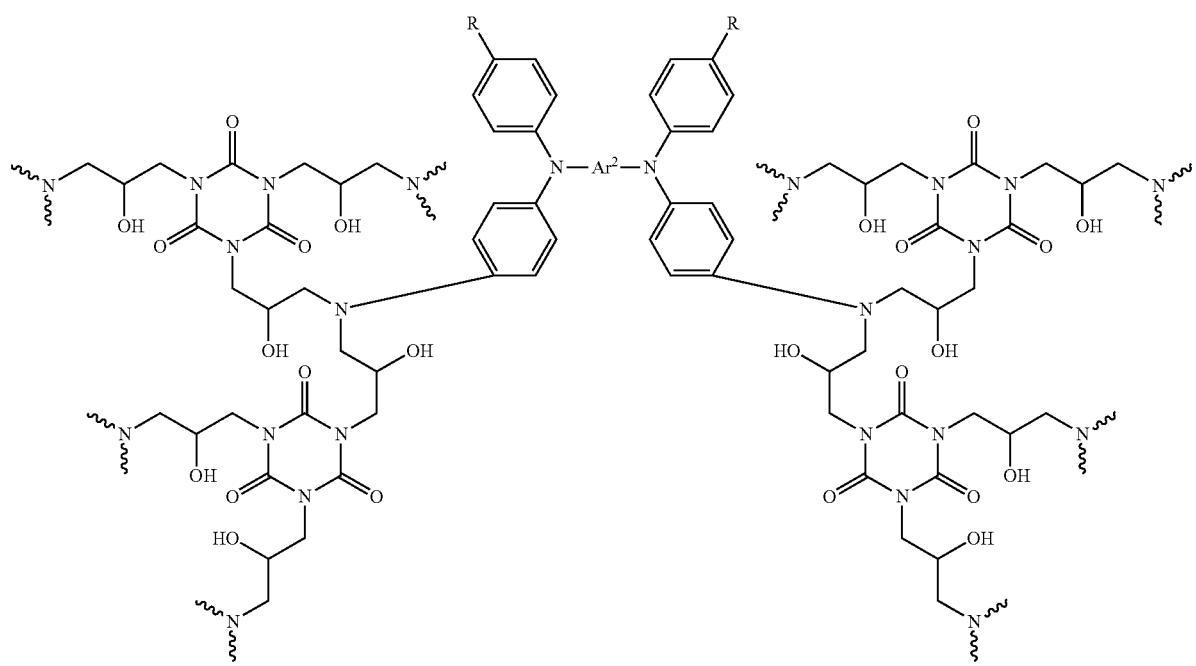

(Formula 26)

In Formula 23 and Formula 24, n is similar to the above definition, and m is between 1 to 300. A transparent electrochromic polymer with an overly large m has an overly high viscosity and therefore is difficult to process in coating. A transparent electrochromic polymer with an overly small m has an insufficient film-forming ability, and so the thermal resistance and applicable temperature range of the polymer are lowered. In Formula 25 and Formula 26, N∼∼∼ is a ring opening part of a reaction of the amino group and the epoxy group.

In one embodiment, the diamine is Formula 27, the epoxy compound is Formula 28, and the transparent electrochromic polymer polymerized from the above diamine and the epoxy compound is shown in Formula 31. In Formula 31, n is similar to the above definition, and m is between 1 to 300.

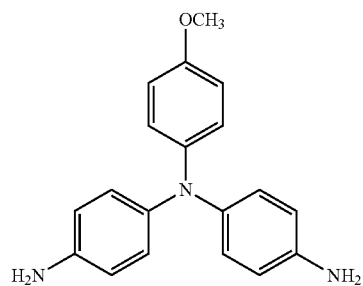
(Formula 27)
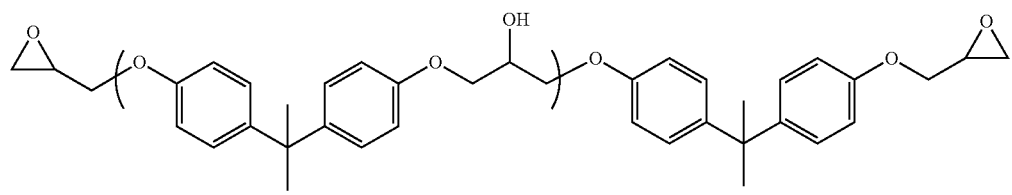
(Formula 28)
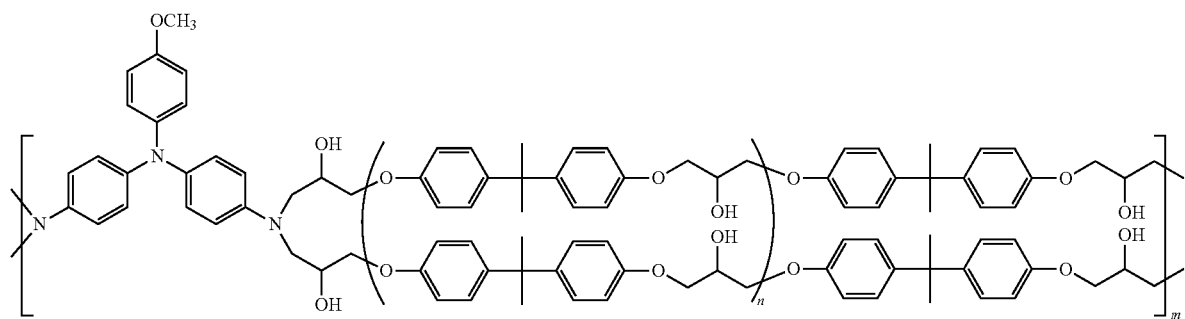
(Formula 31)
In one embodiment, the diamine is Formula 29, the epoxy compound is Formula 28, and the transparent electrochromic polymer polymerized from the above diamine and the epoxy compound is shown in Formula 32. In Formula 32, n is similar to the above definition, and m is similar to the above definition.
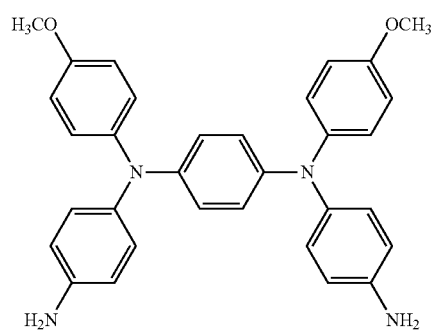
(Formula 29)

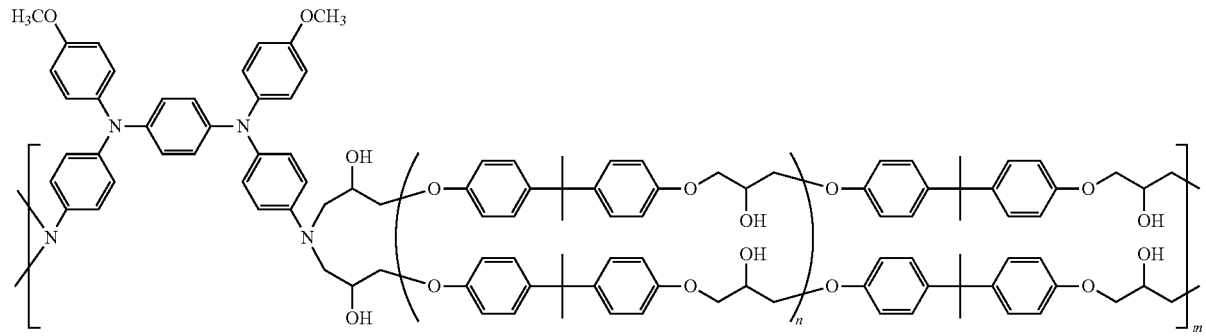

(Formula 32)

In one embodiment, the diamine is Formula 30, the epoxy compound is Formula 28, and the transparent electrochromic polymer polymerized from the above diamine and the epoxy compound is shown in Formula 33. In Formula 33, n is similar to the above definition, and m is similar to the above definition.

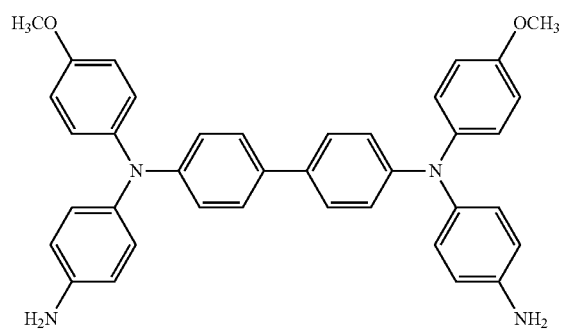

(Formula 30)

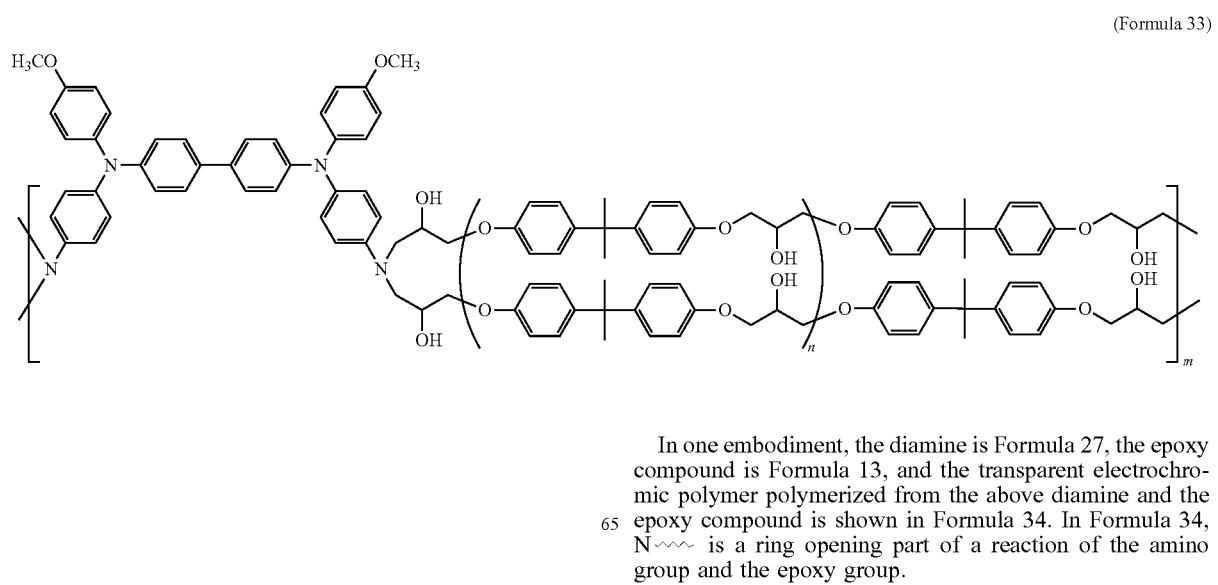

(Formula 33)

In one embodiment, the diamine is Formula 27, the epoxy compound is Formula 13, and the transparent electrochromic polymer polymerized from the above diamine and the epoxy compound is shown in Formula 34. In Formula 34, N⁓ is a ring opening part of a reaction of the amino group and the epoxy group.

(Formula 34)

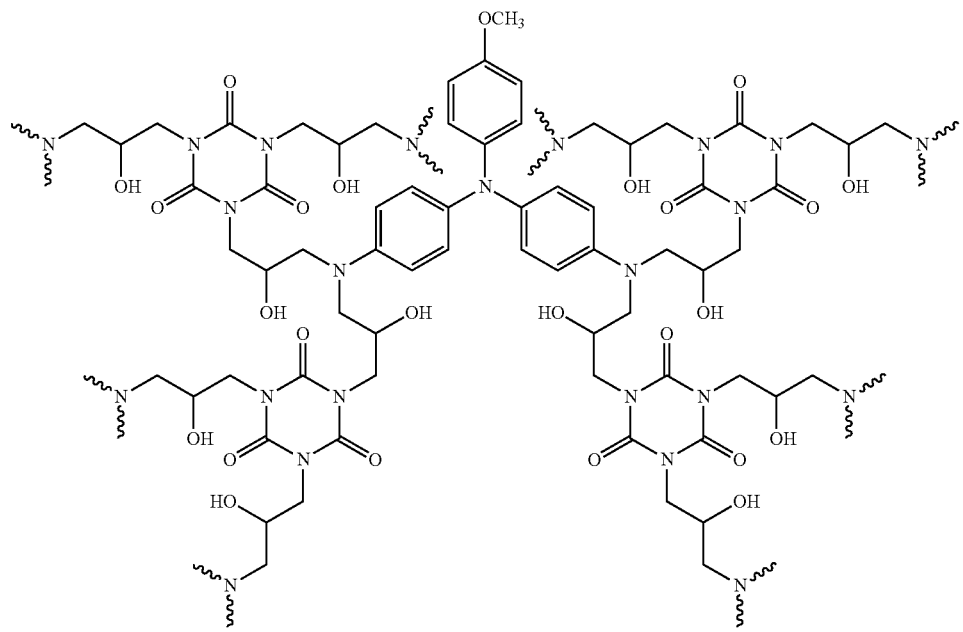

In one embodiment, the diamine is Formula 29, the epoxy compound is Formula 13, and the transparent electrochromic polymer polymerized from the above diamine and the epoxy compound is shown in Formula 35. In Formula 35, N ∼∼ is a ring opening part of a reaction of an amino group and an epoxy group.

(Formula 35)

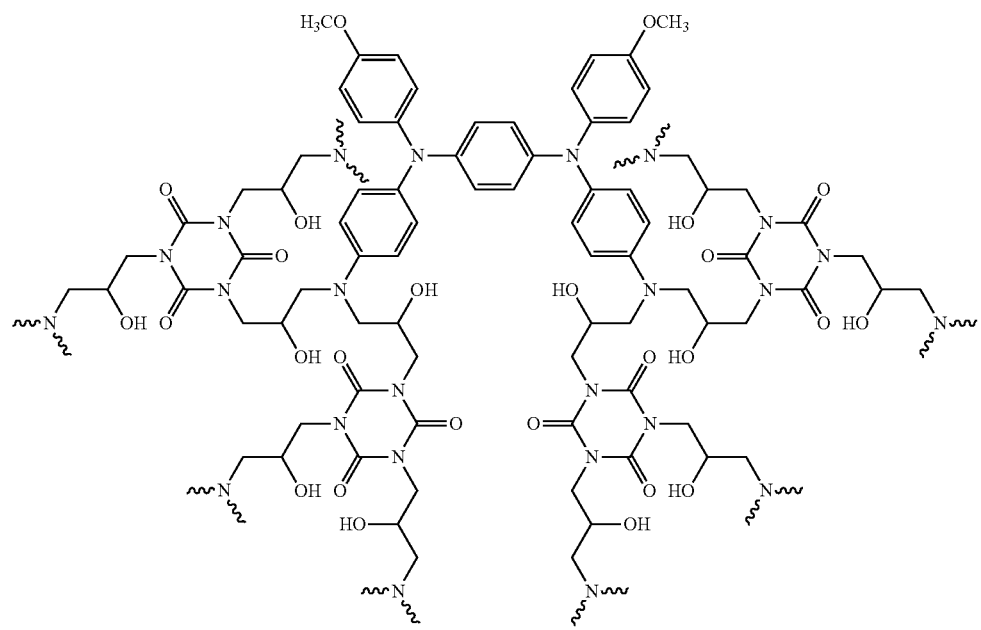

In one embodiment, the transparent electrochromic polymer has a weight average molecular weight of 1,000 to 300,000. A transparent electrochromic polymer with an overly high weight average molecular weight has an overly high viscosity and therefore is difficult to process in coating.

A transparent electrochromic polymer with an overly low weight average molecular weight has an insufficient film-forming ability.

The transparent electrochromic polymer will transfer from colorless to a specific color (e.g. yellow green, sky blue, blue, deep blue, or deep purple) after being applied with a suitable voltage. The specific color and the voltage depend on the chemical structure of the transparent electrochromic polymer. As shown in FIG. 1, the transparent electrochromic polymer solution is wet coated on a transparent conductive layer 1. The solvent of the coating is removed by baking to form the transparent electrochromic polymer film 3. Subsequently, an electrolyte 5 is formed on the transparent electrochromic polymer film 3 by the similar wet coating to complete a layered device. A transparent conductive layer 7 is then attached to the layered device, and a sealing-glue 9 such as epoxy resin is coated on the attaching portion of the two transparent conductive layers 1 and 7. A conductive material 11 such as copper serving as a working electrode is attached thereto to complete an electrochromic device 100.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

The diamines of Formulae 27, 29, and 30 were prepared according to *J. Polym. Sci. Part A: Polym. Chem.* 2006, 44, 4579-4592, *Chem. Mater.* 2009, 21, 4062-4070, and *J. Mater. Chem.* 2011, 21, 6230-6237.

Example 1

Preparation of a Thick Film 0.3316 g of the diamine of Formula 27 (1.0859 mmole, 1 equivalent) and 1.6193 g of the epoxy compound of Formula 28 (4.3671 mmol, 2 equivalents, epoxy equivalent per weight=185 eq/g, NPEL. Series commercially available from NanYa Plastics Corp.) were dissolved in 1 mL of dimethylacetamide (DMAc) to form a homogeneous solution. The solution was heated to 60° C. and kept at 60° C. for 2 hours to form a precursor solution. The precursor solution was then dripped into a mold made of release paper, and then baked by hot air under nitrogen at 140° C. for 12 hours to remove most of the solvent. The semi-dried film was put in a vacuum and heated to dry in the following steps: 40° C. for 3 hours, 170° C. for 1.5 hours, and 200° C. for 3 hours. As such, a thick film of Formula 31 with a thickness of 825±35 μm was obtained. The thick film was directly tested by thermal analysis to measure its softening temperature ($T_s$), glass transfer temperature ($T_g$), thermal decomposition temperature ($T_d$), char yield, and limited oxygen index (LOI) as tabulated in Table 1.

Example 2

Preparation of a Thick Film 0.4399 g of the diamine of Formula 29 (0.8752 mmole, 1 equivalent) and 1.3050 g of the epoxy compound of Formula 28 (3.1594 mmol, 2 equivalents, epoxy equivalent per weight=185 eq/g, NPEL. Series commercially available from Nanya Plastics Corp.) were dissolved in 1 mL of DMAc to form a homogeneous solution. The solution was heated to 60° C. and kept at 60° C. for 2 hours to form a precursor solution. The precursor solution was then dripped into a mold made of release paper, and then baked by hot air under nitrogen at 140° C. for 12 hours to remove most of the solvent. The semi-dried film was put in a vacuum and heated to dry in the following steps: 40° C. for 3 hours, 180° C. for 4 hours, and 200° C. for 3 hours. As such, a thick film of Formula 32 with a thickness of 705±35 μm was obtained. The thick film was directly tested by thermal analysis to measure its softening temperature ($T_s$), glass transfer temperature ($T_g$), thermal decomposition temperature ($T_d$), char yield, and limited oxygen index (LOI) as tabulated in Table 1.

Example 3

Preparation of a Thick Film 0.2876 g of the diamine of Formula 30 (0.4836 mmole, 1 equivalent) and 0.7210 g of the epoxy compound of Formula 28 (1.944 mmol, 2 equivalents, epoxy equivalent per weight=185 eq/g, NPEL. Series commercially available from NanYa Plasticss Corp.) were dissolved in 5 mL of DMAc to form a homogeneous solution. The solution was heated to 120° C. and kept at 120° C. for 2 hours to form a precursor solution. The precursor solution was then dripped into a mold made of release paper, and then baked by hot air under nitrogen at 140° C. for 12 hours to remove most of the solvent. The semi-dried film was put in a vacuum and heated to dry in the following steps: 40° C. for 3 hours, 180° C. for 1.5 hours, and 200° C. for 3 hours. As such, a thick film of Formula 33 with a thickness of 705±35 μm was obtained. The thick film was directly tested by thermal analysis to measure its softening temperature ($T_s$), glass transfer temperature ($T_g$), thermal decomposition temperature ($T_d$), char yield, and limited oxygen index (LOI) as tabulated in Table 1.

TABLE 1

| Example | $T_s$ (° C.)[a] | $T_g$ (° C.)[b] | $T_d^5$ (° C.)[c] N$_2$ | $T_d^5$ (° C.)[c] Air | $T_d^{10}$ (° C.)[c] N$_2$ | $T_d^{10}$ (° C.)[c] Air | Char yield (wt %)[d] | LOI[e] |
|---|---|---|---|---|---|---|---|---|
| Example 1 (Formula 31) | 111 | 155 | 360 | 335 | 385 | 380 | 18 | 25 |
| Example 2 (Formula 32) | 141 | 170 | 385 | 380 | 405 | 410 | 23 | 27 |
| Example 3 (Formula 33) | 143 | 173 | 360 | 350 | 375 | 380 | 24 | 27 |

[a]The softening temperature was measured as below: the thick film was put in a thermal mechanical analyzer (TMA) to be heated at a rate of 10° C./minute and continuously punched by a pressure of 50 mN to record the temperature of the film being punched through.
[b]The glass transfer temperature was measured as below: the thick film was cut as a sample with a length of 30.0 mm, a width of 1.00 mm, and a thickness of 0.30 to 0.56 mm, and then put into a dynamic mechanical analyzer (DMA) to be heated at a rate of 3° C./minute with a loading frequency of 1 Hz, 1 Hz under air to measure the glass transfer temperature of the sample.
[c]The thick film was put into a thermal gravity analyzer (TGA) conducted by a gas (nitrogen or air) with a rate of 30 cm$^3$/minute, and the thick film was heated at a rate of 20° C./minute to record the temperatures of the thick film losing 5% weight and 10% weight.
[d]The residue weight % of the thick film after being heated to 850° C. under nitrogen.
[e]LOI = (17.5 + 0.4 × char yield at 850° C.).

Example 4

Preparation of a Thin Film 0.1978 g of the diamine of Formula 27 (0.6477 mmole, 1 equivalent) and 0.9658 g of the epoxy compound of Formula 28 (2.6046 mmol, 2 equivalents, epoxy equivalent per weight=185 eq/g, NPEL. Series commercially available from NanYa Plastics Corp.) were dissolved in 5.8 mL of DMAc to form a homogeneous solution. The solution was heated to 60° C. and kept at 60° C. for 2 hours to form a precursor solution. The precursor solution was then spin coated on an ITO glass substrate, and then heated to 170° C. and kept at 170° C. for 1.5 hours to be cured. The cured film was put in a vacuum and heated to 200° C. and kept at 200° C. for 3 hours. As such, a thin film of Formula 31 with a thickness of 215±15 nm was obtained for further electrochemical and spectroelectrochemical analysis.

Figure 2A:
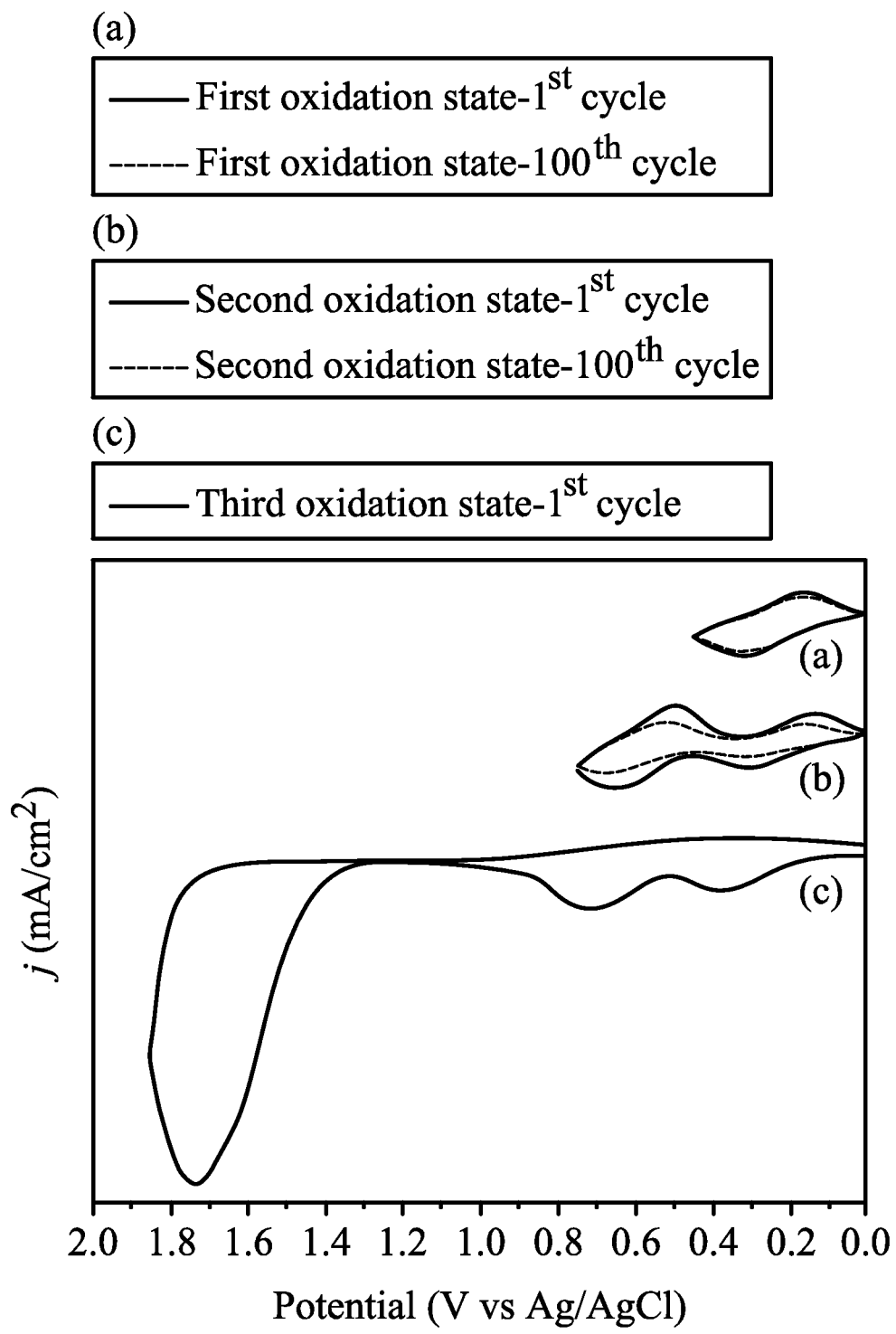
FIGS. 2A to 2E show cyclic voltammetry diagrams of electrochromic films in Examples of the disclosure.

The electrochemical analysis was performed by CH Instruments 612C to scan potentials of the thin film. The cyclic voltammetry (CV) was performed by a three-electrode system, wherein the ITO glass served as a working electrode (the coated polymer had an area of about 2.0 cm×0.8 cm), an Ag/AgCl electrode (in saturated KCl solution) served as a reference electrode, a platinum wire served as an auxiliary electrode, 0.1M of tetrabutylammonium perchloride solution (in acetonitrile) served as an electrolyte, and a scan rate was 50 mV/s. The thin film (Formula 31) had a CV diagram as shown in FIG. 2A, and electrochemical properties as tabulated in Table 2.

Figure 3A:
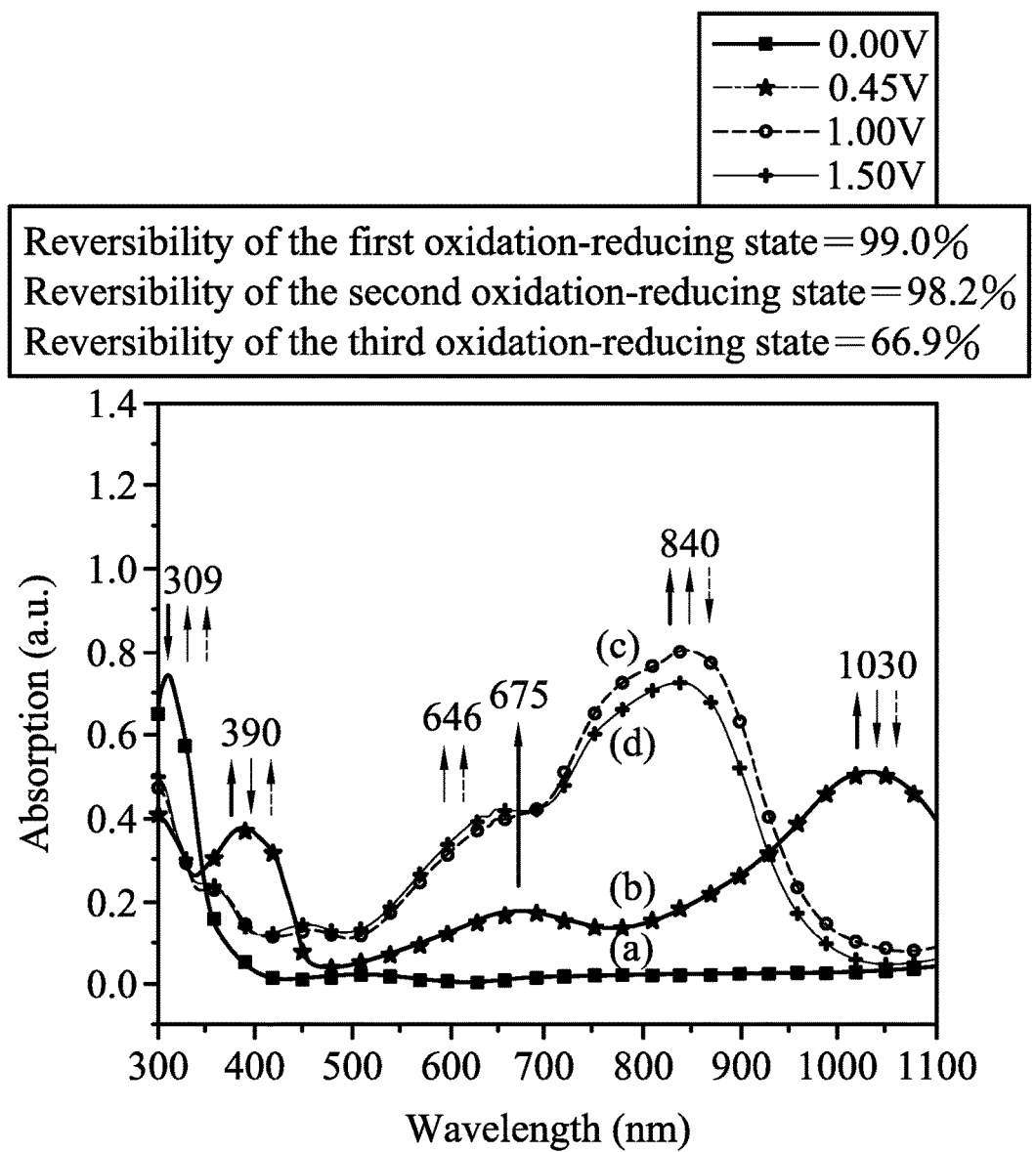
FIGS. 3A to 3E show absorption spectra corresponding to lights of different wavelength of electrochromic films with different oxidation states in Examples of the disclosure.

In the spectroelectrochemical analysis, the ITO glass with the thin film of Formula 31 formed thereon served as a working electrode. The working electrode was dipped in a quartz cell with an optical length of 1 cm. An Ag/AgCl electrode (in saturated KCl solution) served as a reference electrode, a platinum wire served as an auxiliary electrode, 0.1M of tetrabutylammonium perchloride solution (in acetonitrile) served as an electrolyte. The UV-VIS-NIR spectrum of the sample in the quartz cell was simultaneously detected by Agilent 8453 UV-VIS spectrometer and Hitachi U-4100 UV-VIS-NIR spectrometer, as shown in FIG. 3A. The film of the transparent electrochromic polymer (Formula 31) was supplied with a voltage from +0.00V to +1.50V, such that the appearance of the film was transferred from transparent colorless (0.00V) to blue-green (+0.45V), pale blue (+1.00V), and deep blue (+1.50V). Although the third oxidation-reducing peak corresponded to an electrochemical reaction without a high reversibility (only 66.9%), the first oxidation-reducing peak had a reversibility of 99%, and the second oxidation-reducing peak had a reversibility of 98.2%. Accordingly, the transparent electrochromic polymer (Formula 31) had excellent electrochemical properties. As shown in the spectroelectrochemical spectrum of FIG. 3A, the film of the original neutral state was completely free of absorption in the visible region. The film was semi-oxidized to be blue-green and fully-oxidized to be deep blue. The triphenyl amine only had an oxidation active site, but its diamine would change to dialkylamine after the diamine reacting with the epoxy compound. In other words, the polymer further had two additional oxidation active sites, thereby having a multicolor change property. The color of the thin film composed of the single material could be changed by controlling the voltage.

Example 5

Preparation of a Thin Film 0.1180 g of the diamine of Formula 29 (0.2348 mmole, 1 equivalent) and 0.3501 g of the epoxy compound of Formula 28 (0.9441 mmol, 2 equivalents, epoxy equivalent per weight=185 eq/g, NPEL. Series commercially available from NanYa Plastics Corp.) were dissolved in 2.3 mL of DMAc to form a homogeneous solution. The solution was heated to 60° C. and kept at 60° C. for 2 hours to form a precursor solution. The precursor solution was then spin coated on an ITO glass substrate, and then heated to 180° C. and kept at 180° C. for 1.5 hours to be cured. The cured film was put in a vacuum and heated to 200° C. and kept at 200° C. for 3 hours. As such, a thin film of Formula 32 with a thickness of 180±10 nm was obtained for further electrochemical and spectroelectrochemical analysis.

Figure 2B:
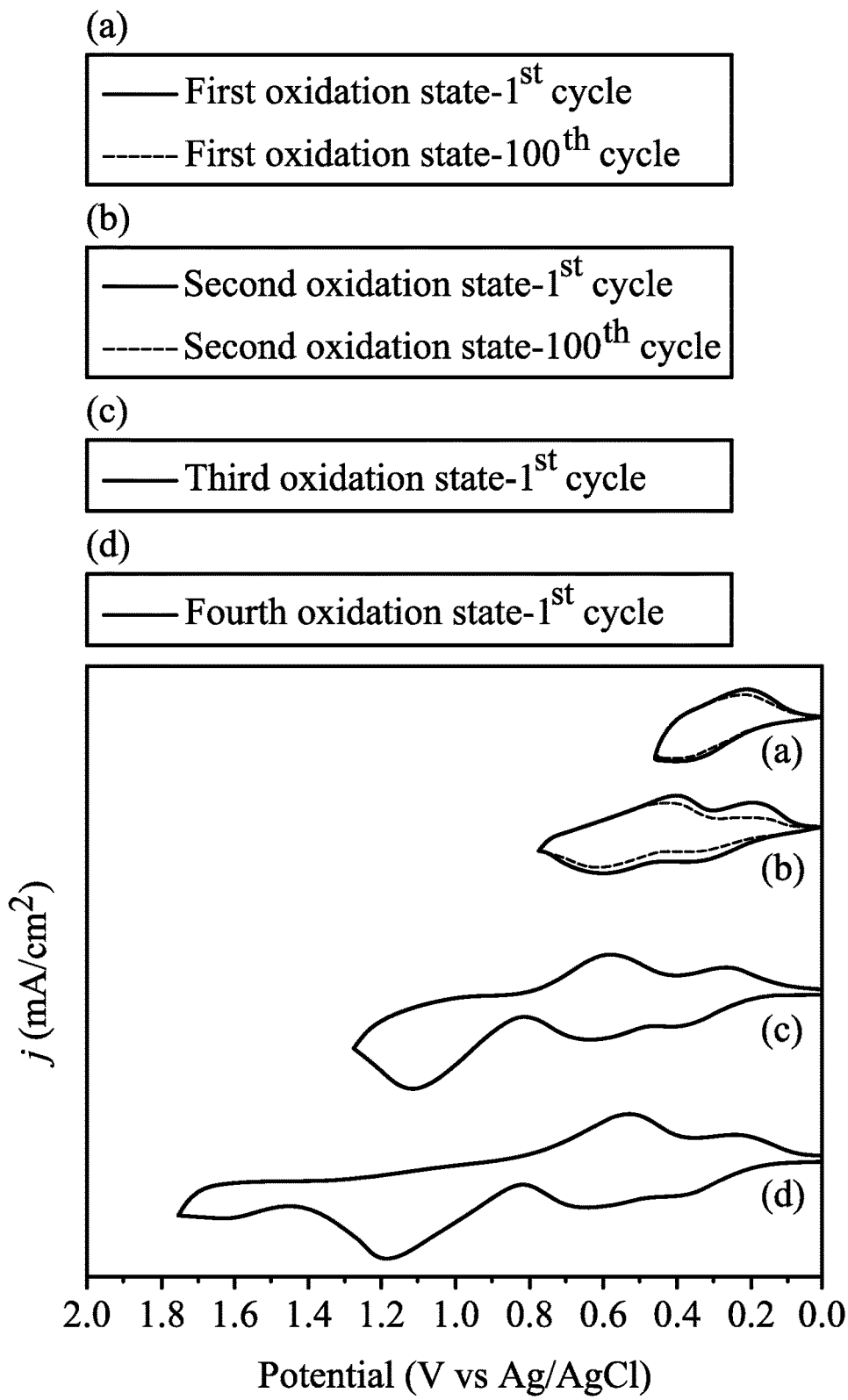

The electrochemical analysis was performed by CH Instruments 612C to scan potentials of the thin film. The cyclic voltammetry (CV) was performed by a three-electrode system, wherein the ITO glass served as a working electrode (the coated polymer had an area of about 2.0 cm×0.8 cm), an Ag/AgCl electrode (in saturated KCl solution) served as a reference electrode, a platinum wire served as an auxiliary electrode, 0.1M of tetrabutylammonium perchloride solution (in acetonitrile) served as an electrolyte, and a scan rate was 50 mV/s. The thin film (Formula 32) had a CV diagram as shown in FIG. 2B, and electrochemical properties as tabulated in Table 2.

Figure 3B:
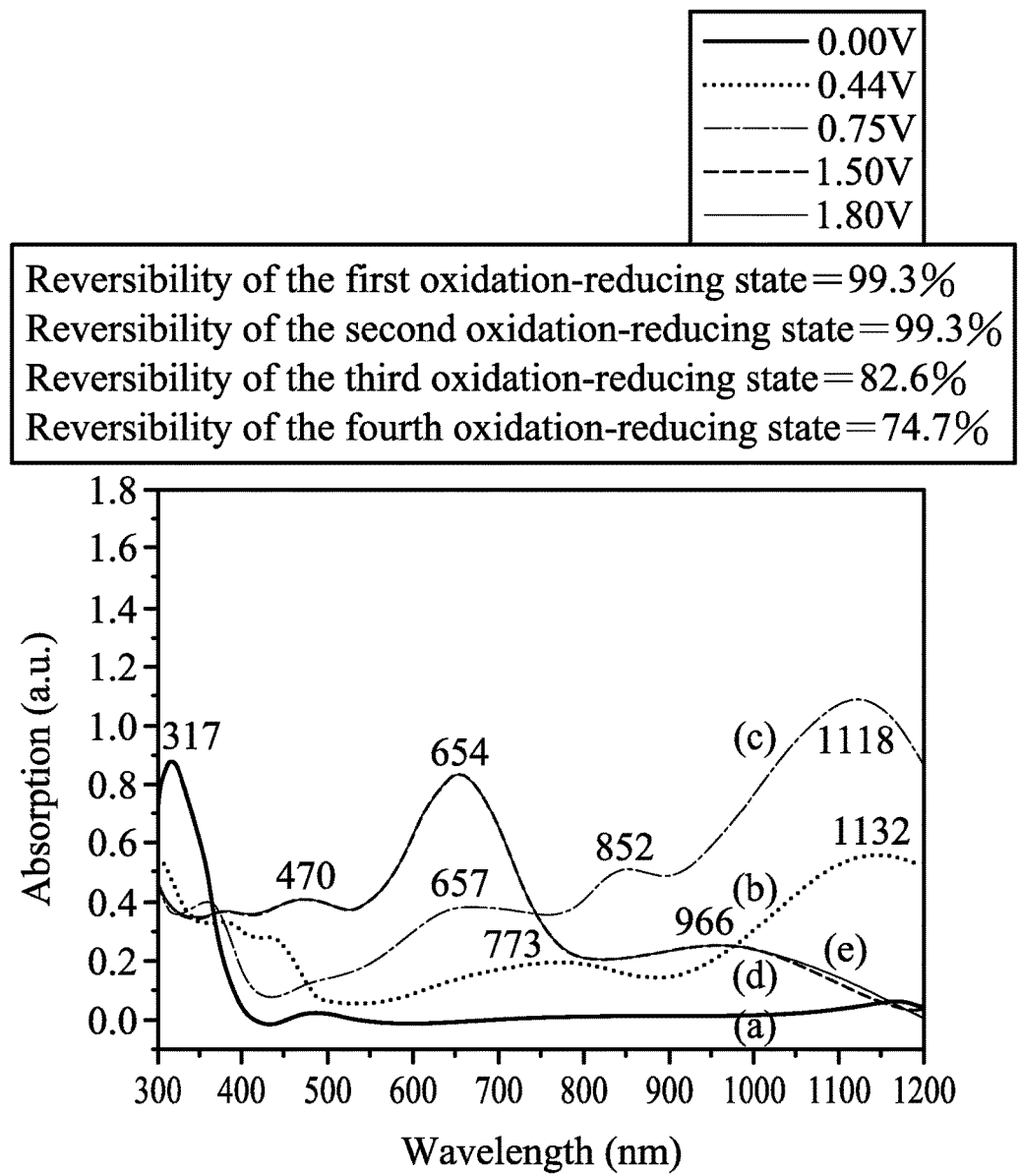

In the spectroelectrochemical analysis, the ITO glass with the thin film of Formula 32 formed thereon served as a working electrode. The working electrode was dipped in a quartz cell with an optical length of 1 cm. An Ag/AgCl electrode (in saturated KCl solution) served as a reference electrode, a platinum wire served as an auxiliary electrode, 0.1M of tetrabutylammonium perchloride solution (in acetonitrile) served as an electrolyte. The UV-VIS-NIR spectrum of the sample in the quartz cell was simultaneously detected by Agilent 8453 UV-VIS spectrometer and Hitachi U-4100 UV-VIS-NIR spectrometer, as shown in FIG. 3B. The film of the transparent electrochromic polymer (Formula 31) was supplied with a voltage from +0.00V to +1.80V, such that the appearance of the film was transferred from transparent colorless (0.00V) to yellow-green (+0.44V), blue-green (+0.75V), blue (+1.50V), and deep blue (+1.80V). Because the p-phenylenediamine had two oxidation active sites (two nitrogen atoms), the first and second oxidation-reducing peaks had a reversibility of 99.3%, and even the third oxidation-reducing peak had a reversibility of 82.6%. Accordingly, the aromatic diamine with strong electron-donating groups could further stabilize the cationic free radical formed by oxidation, thereby having excellent electrochemical properties. As shown in the spectroelectrochemical spectrum of FIG. 3B, the film of the original neutral state was completely free of absorption in the visible region. The film was semi-oxidized to be yellow-green and fully-oxidized to be deep blue. The diamine had two oxidation active sites that could react with the epoxy compound to further have two additional oxidation active sites, thereby having a multicolor change property. The color of the thin film composed of the single material could be changed by controlling the voltage.

Example 6

Preparation of a Thin Film 0.1438 g of the diamine of Formula 30 (0.2418 mmole, 1 equivalent) and 0.3605 g of the epoxy compound of Formula 28 (0.9722 mmol, 2 equivalents, epoxy equivalent per weight=185 eq/g, NPEL. Series commercially available from NanYa Plastics Corp.) were dissolved in 2.5 mL of DMAc to form a homogeneous solution. The solution was heated to 60° C. and kept at 60° C. for 2 hours to form a precursor solution. The precursor solution was then spin coated on an ITO glass substrate, and then heated to 180° C.

and kept at 180° C. for 1.5 hours to be cured. The cured film was put in a vacuum and heated to 200° C. and kept at 200° C. for 3 hours. As such, a thin film of Formula 33 with a thickness of 240±20 nm was obtained for further electrochemical and spectroelectrochemical analysis.

Figure 2C:
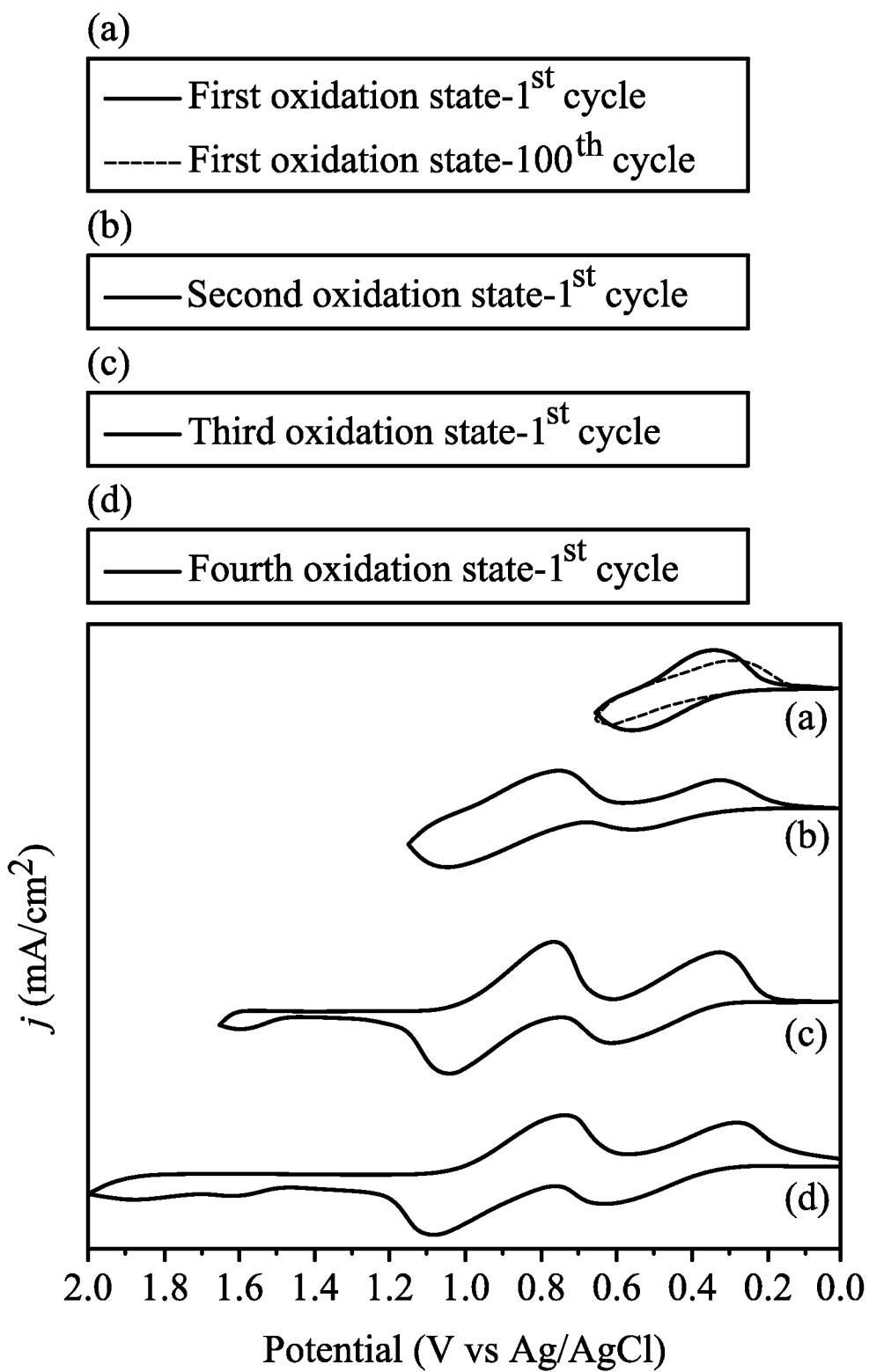

The electrochemical analysis was performed by CH Instruments 612C to scan potentials of the thin film. The cyclic voltammetry (CV) was performed by a three-electrode system, wherein the ITO glass served as a working electrode (the coated polymer had an area of about 2.0 cm×0.8 cm), an Ag/AgCl electrode (in saturated KCl solution) served as a reference electrode, a platinum wire served as an auxiliary electrode, 0.1M of tetrabutylammonium perchloride solution (in acetonitrile) served as an electrolyte, and a scan rate was 50 mV/s. The thin film (Formula 33) had a CV diagram as shown in FIG. 2C, and electrochemical properties as tabulated in Table 2.

Figure 3C:
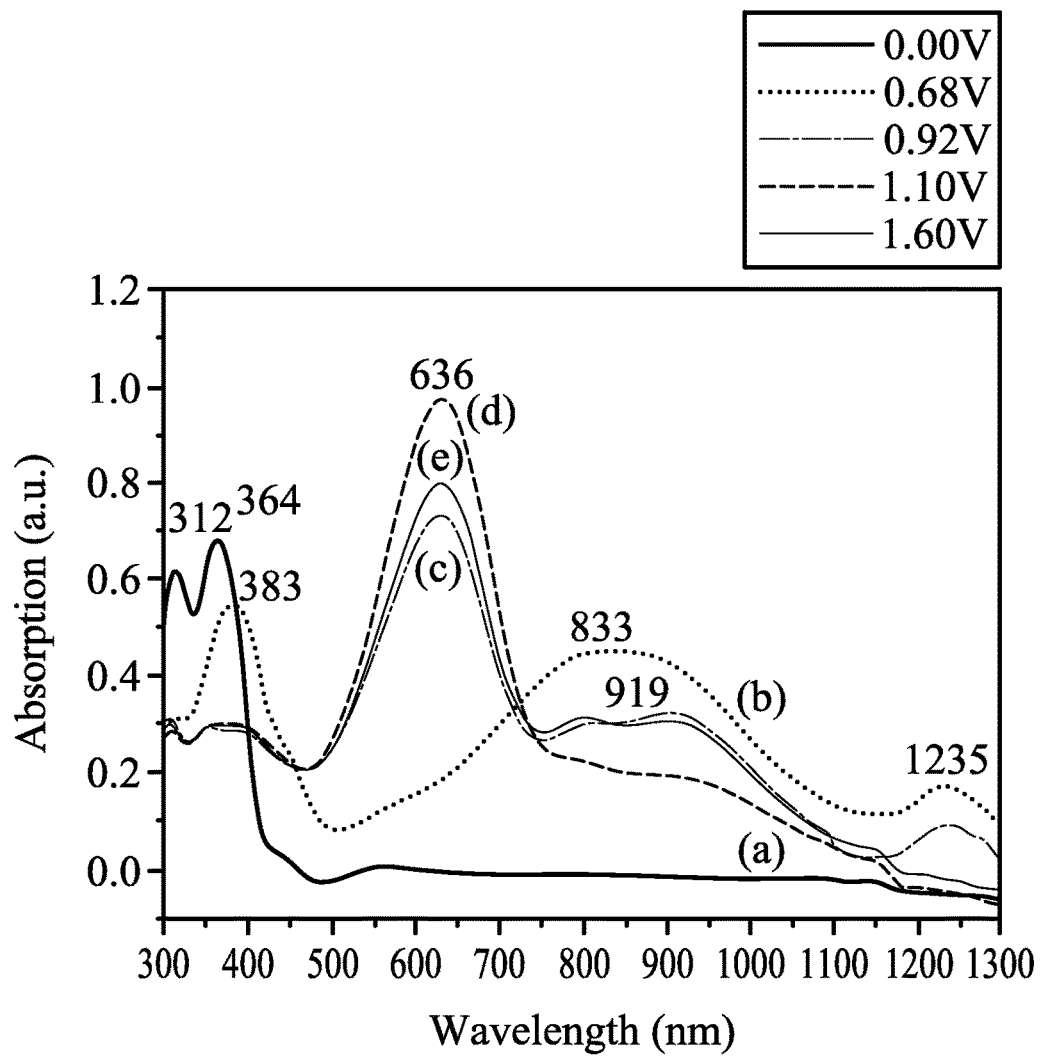

In the spectroelectrochemical analysis, the ITO glass with the thin film of Formula 33 formed thereon served as a working electrode. The working electrode was dipped in a quartz cell with an optical length of 1 cm. An Ag/AgCl electrode (in saturated KCl solution) served as a reference electrode, a platinum wire served as an auxiliary electrode, 0.1M of tetrabutylammonium perchloride solution (in acetonitrile) served as an electrolyte. The UV-VIS-NIR spectrum of the sample in the quartz cell was simultaneously detected by Agilent 8453 UV-VIS spectrometer and Hitachi U-4100 UV-VIS-NIR spectrometer, as shown in FIG. 3C. The film of the transparent electrochromic polymer (Formula 31) was supplied with a voltage from +0.00V to +1.60V, such that the appearance of the film was transferred from transparent colorless (0.00V) to yellow-green (+0.68V), cyan (+0.92V), sky blue (+1.10V), and deep blue (+1.60V). Because the p-biphenylenediamine had two oxidation active sites (two nitrogen atoms) and a longer conjugated length, it has more color change properties. The color of the thin film composed of the single material could be changed by controlling the voltage.

The thick film was directly tested by thermal analysis to measure its softening temperature ($T_s$), thermal decomposition temperature ($T_d$), char yield, and limited oxygen index (LOI) as tabulated in Table 3.

Example 8

Preparation of a Thick Film 0.6363 g of the diamine of Formula 29 (0.8752 mmole, 1 equivalent) and 1.2260 g of the epoxy compound of Formula 13 (3.3758 mmol, 2 equivalents) were dissolved in 1 mL of DMAc to form a homogeneous solution. The solution was heated to 60° C. and kept at 60° C. for 2 hours to form a precursor solution. The precursor solution was then dripped into a mold made of release paper, and then baked by hot air under nitrogen at 120° C. for 12 hours to remove most of the solvent. The semi-dried film was put in a vacuum and heated to dry in the following steps: 40° C. for 3 hours, 140° C. for 4 hours, and 180° C. for 3 hours. As such, a thick film of Formula 35 with a thickness of 880±20 μm was obtained. The thick film was directly tested by thermal analysis to measure its softening temperature ($T_s$), thermal decomposition temperature ($T_d$), char yield, and limited oxygen index (LOI) as tabulated in Table 3.

TABLE 3

| Example | $T_s$ (° C.)[a] | $T_d^5$ (° C.)[b] N₂ | Air | $T_d^{10}$ (° C.)[b] N₂ | Air | Char yield (wt %)[c] | LOI[d] |
|---|---|---|---|---|---|---|---|
| Example 7 (Formula 34) | 270 | 295 | 290 | 315 | 310 | 15 | 24 |
| Example 8 (Formula 35) | 280 | 310 | 315 | 325 | 330 | 12 | 22 |

TABLE 2

| | Oxidation potential (V)[a] | | | | |
|---|---|---|---|---|---|
| Example | $E_{onset}$ | $E_{1/2}$ (First oxidation state) | $E_{1/2}$ (Second oxidation state) | $E_p$ (Third oxidation state)[b] | $E_p$ (Fourth oxidation state)[b] |
| Example 4 (Formula 31) | 0.16 | 0.24 | 0.58 | 1.74 | — |
| Example 5 (Formula 32) | 0.16 | 0.28 | 0.49 | 1.17 | 1.61 |
| Example 6 (Formula 33) | 0.32 | 0.44 | 0.90[c] | | 1.61 |

[a]Cyclic voltammetry with a reference electrode of Ag/AgCl in CH₃CN.
[b]Electrical potential peak of the irreversible step.
[c]Confirmed by Nernst Equation

Example 7

Preparation of a Thick Film 0.4621 g of the diamine of Formula 27 (1.5132 mmole, 1 equivalent) and 1.2240 g of the epoxy compound of Formula 13 (4.0351 mmol, 2 equivalents) were dissolved in 1 mL of DMAc to form a homogeneous solution. The solution was heated to 80° C. and kept at 80° C. for 2 hours to form a precursor solution. The precursor solution was then dripped into a mold made of release paper, and then baked by hot air under nitrogen at 140° C. for 12 hours to remove most of the solvent. The semi-dried film was put in a vacuum and heated to dry in the following steps: 40° C. for 3 hours, 130° C. for 1.5 hours, and 180° C. for 3 hours. As such, a thick film of Formula 34 with a thickness of 790±60 μm was obtained.

TABLE 3-continued

| Example | $T_s$ (° C.)[a] | $T_d^5$ (° C.)[b] N₂ | Air | $T_d^{10}$ (° C.)[b] N₂ | Air | Char yield (wt %)[c] | LOI[d] |
|---|---|---|---|---|---|---|---|

[a]The softening temperature was measured as below: the thick film was put in a thermal mechanical analyzer (TMA) to be heated at a rate of 10° C./minute and continuously punched by a pressure of 50 mN to record the temperature of the film being punched through.
[b]The thick film was put into a thermal gravity analyzer (TGA) conducted by a gas (nitrogen or air) with a rate of 30 cm³/minute, and the thick film was heated at a rate of 20° C./minute to record the temperatures of the thick film losing 5% weight and 10% weight.
[c]The residue weight % of the thick film after being heated to 850° C. under nitrogen.
[d]LOI = (17.5 + 0.4 × char yield at 850° C.).

Example 9

0.0614 g of the diamine of Formula 27 (0.2011 mmole, 1 equivalent) and 0.1627 g of the epoxy compound of Formula 13 (0.5364 mmol, 2 equivalents) were dissolved in 1.5 mL of DMAc to form a homogeneous solution. The solution was heated to 80° C. and kept at 80° C. for 2 hours to form a precursor solution. The precursor solution was then spin coated on an ITO glass substrate, and then heated to 130° C. and kept at 130° C. for 1.5 hours to be cured. The cured film was put in a vacuum and heated to 180° C. and kept at 180° C. for 3 hours. As such, a thin film of Formula 34 with a thickness of 135±15 nm was obtained for further electrochemical and spectroelectrochemical analysis.

Figure 2D:
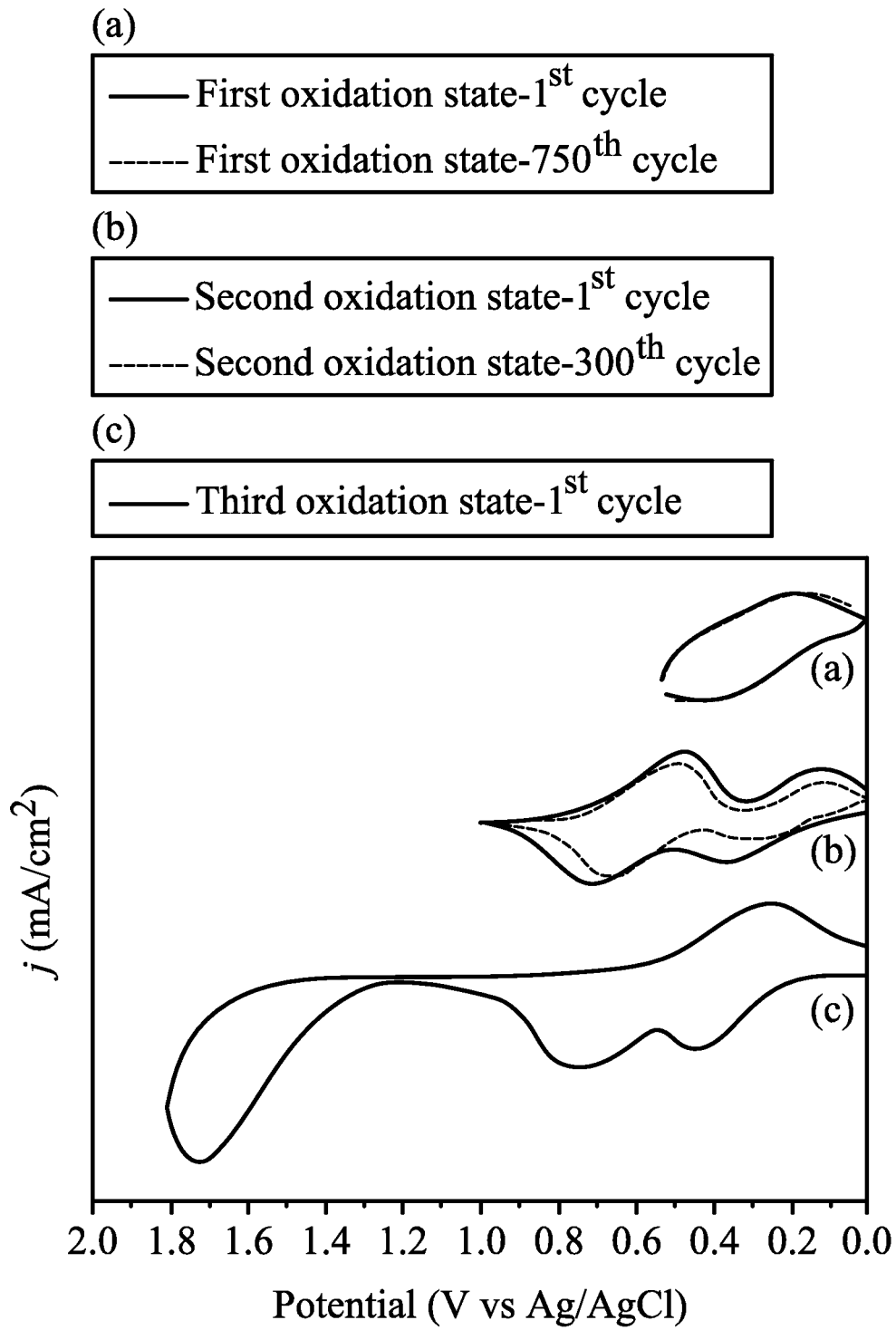

The electrochemical analysis was performed by CH Instruments 612C to scan potentials of the thin film. The cyclic voltammetry (CV) was performed by a three-electrode system, wherein the ITO glass served as a working electrode (the coated polymer had an area of about 2.0 cm×0.8 cm), an Ag/AgCl electrode (in saturated KCl solution) served as a reference electrode, a platinum wire served as an auxiliary electrode, 0.1M of tetrabutylammonium perchloride solution (in acetonitrile) served as an electrolyte, and a scan rate was 50 mV/s. The thin film (Formula 34) had a CV diagram as shown in FIG. 2D, and electrochemical properties as tabulated in Table 4.

Figure 3D:
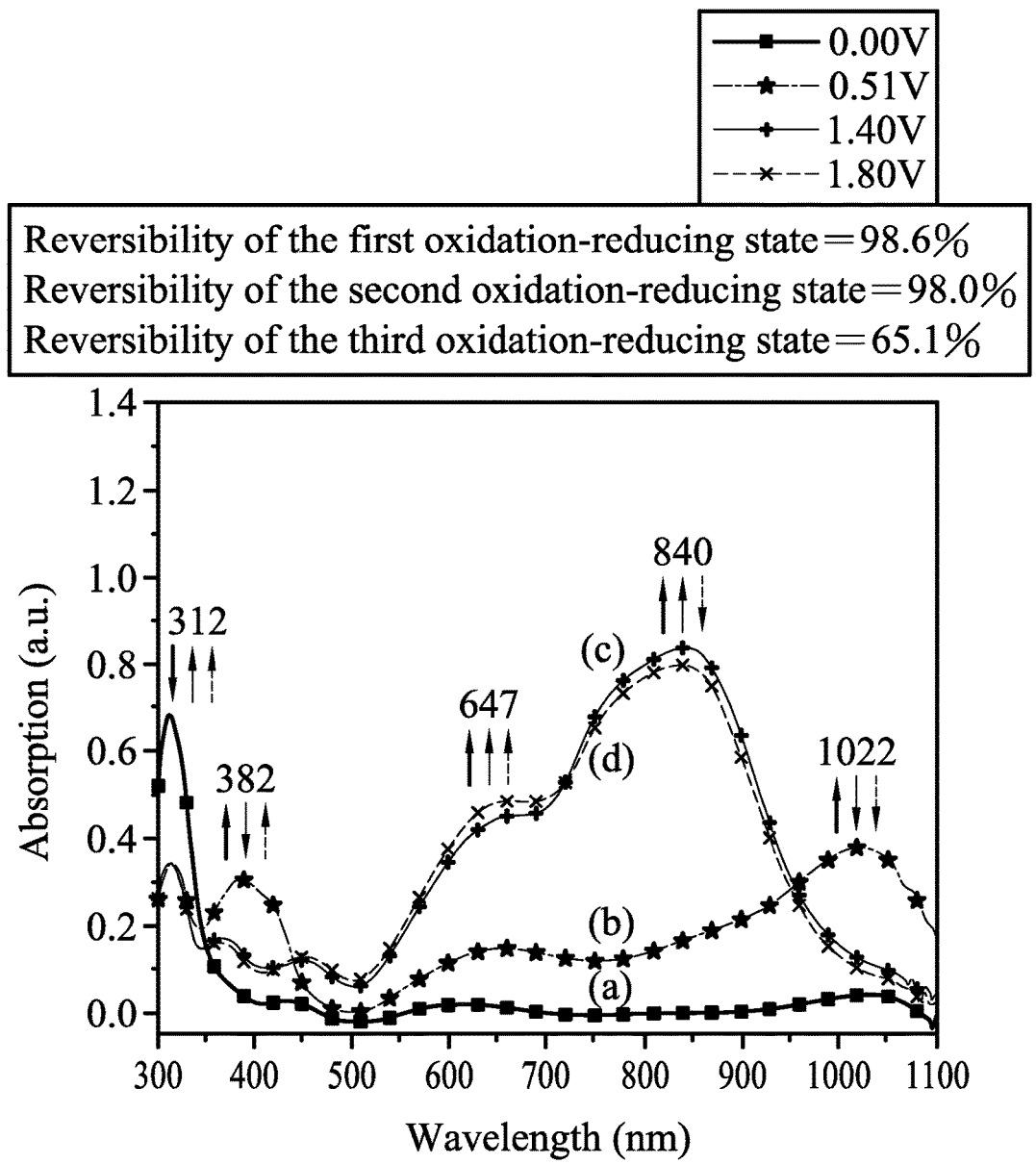

In the spectroelectrochemical analysis, the ITO glass with the thin film of Formula 34 formed thereon served as a working electrode. The working electrode was dipped in a quartz cell with an optical length of 1 cm. An Ag/AgCl electrode (in saturated KCl solution) served as a reference electrode, a platinum wire served as an auxiliary electrode, 0.1M of tetrabutylammonium perchloride solution (in acetonitrile) served as an electrolyte. The UV-VIS-NIR spectrum of the sample in the quartz cell was simultaneously detected by Agilent 8453 UV-VIS spectrometer and Hitachi U-4100 UV-VIS-NIR spectrometer, as shown in FIG. 3D. The film of the transparent electrochromic polymer (Formula 34) was supplied with a voltage from +0.00V to +1.80V, such that the appearance of the film was transferred from transparent colorless (0.00V) to blue-green (+0.51V), deep blue (+1.40V), and pale blue (+1.80V). Although the third oxidation-reducing peak corresponded to an electrochemical reaction without a high reversibility (only 65.1%), the first oxidation-reducing peak had a reversibility of 98.6%, and the second oxidation-reducing peak had a reversibility of 98.0%. Accordingly, the transparent electrochromic polymer (Formula 34) had excellent electrochemical properties. As shown in the spectroelectrochemical spectrum of FIG. 3D, the film of the original neutral state was completely free of absorption in the visible region. The film was semi-oxidized to be blue-green and fully-oxidized to be deep blue. The triphenyl amine only had an oxidation active site, but its diamine would change to dialkylamine after the diamine reacting with the epoxy compound. In other words, the polymer further had two additional oxidation active sites, thereby having a multicolor change property. The color of the thin film composed of the single material could be changed by controlling the voltage.

The film of Formula 34 was copolymerized of the diamine and the cycloaliphatic epoxy compound. Compared to the films of Formulae 31 to 33, the film of Formula 34 had a higher transmittance at zero oxidation state and similar color change active sites, such that the film of Formula 35 had a higher contrast.

Example 10

0.1655 g of the diamine of Formula 29 (0.3293 mmole, 1 equivalent) and 0.2661 g of the epoxy compound of Formula 13 (0.8772 mmol, 2 equivalents) were dissolved in 2.5 mL of DMAc to form a homogeneous solution. The solution was heated to 80° C. and kept at 80° C. for 2 hours to form a precursor solution. The precursor solution was then spin coated on an ITO glass substrate, and then heated to 140° C. and kept at 140° C. for 3 hours to be cured. The cured film was put in a vacuum and heated to 180° C. and kept at 180° C. for 3 hours. As such, a thin film of Formula 35 with a thickness of 170±20 nm was obtained for further electrochemical and spectroelectrochemical analysis.

Figure 2E:
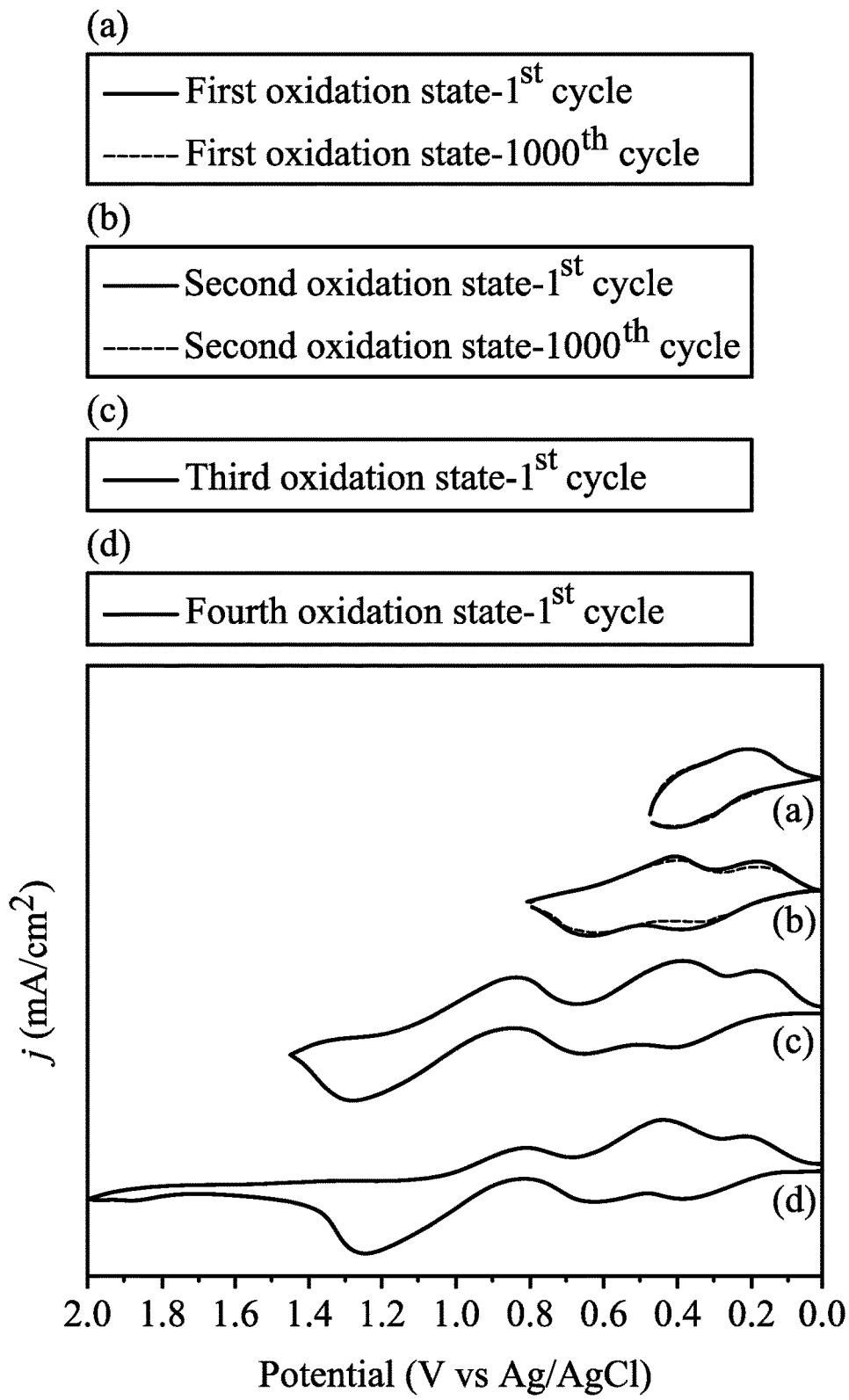

The electrochemical analysis was performed by CH Instruments 612C to scan potentials of the thin film. The cyclic voltammetry (CV) was performed by a three-electrode system, wherein the ITO glass served as a working electrode (the coated polymer had an area of about 2.0 cm×0.8 cm), an Ag/AgCl electrode (in saturated KCl solution) served as a reference electrode, a platinum wire served as an auxiliary electrode, 0.1M of tetrabutylammonium perchloride solution (in acetonitrile) served as an electrolyte, and a scan rate was 50 mV/s. Thin film (Formula 35) had a CV diagram as shown in FIG. 2E, and electrochemical properties as tabulated in Table 4.

Figure 3E:
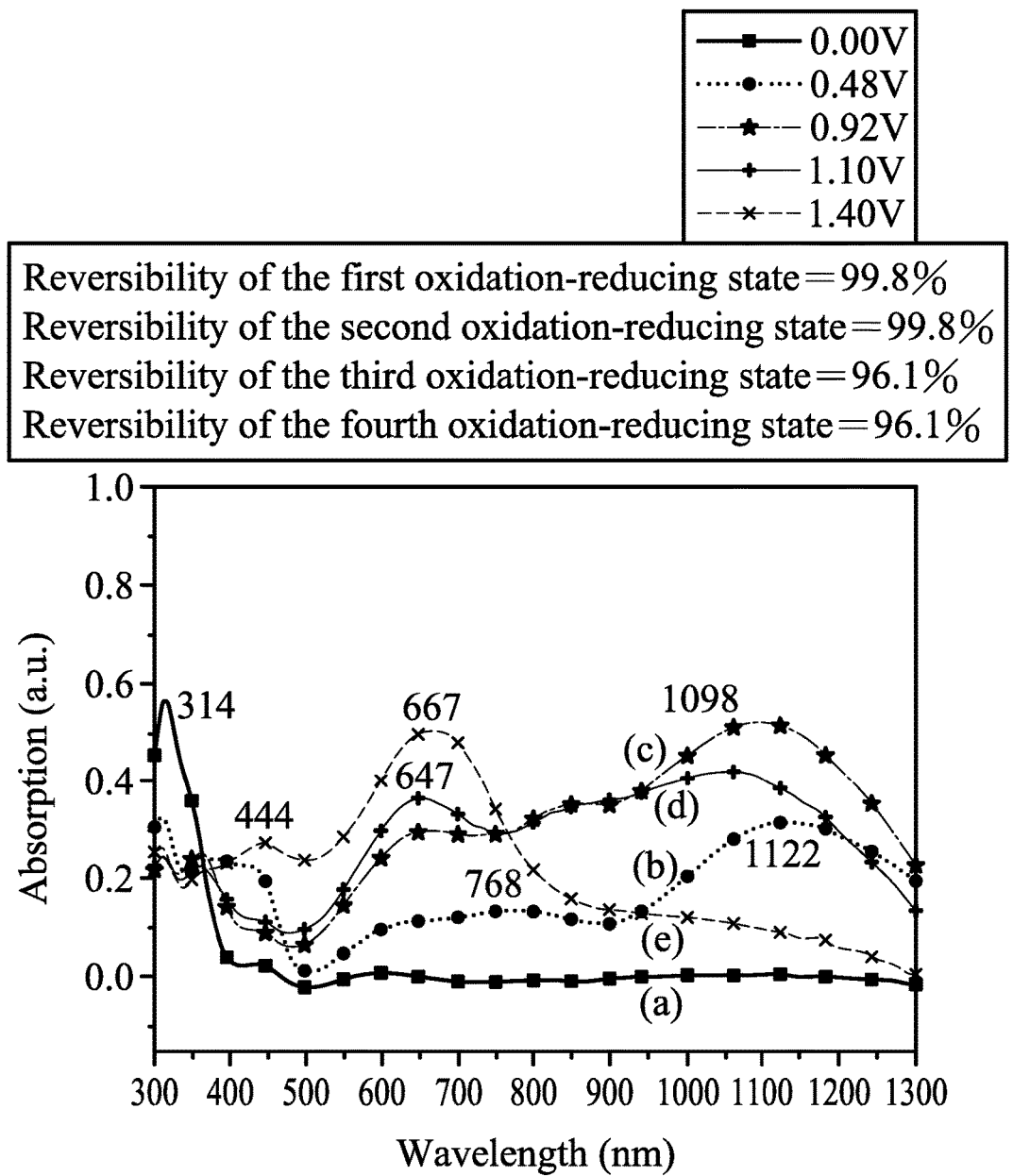

In the spectroelectrochemical analysis, the ITO glass with the thin film of Formula 35 formed thereon served as a working electrode. The working electrode was dipped in a quartz cell with an optical length of 1 cm. An Ag/AgCl electrode (in saturated KCl solution) served as a reference electrode, a platinum wire served as an auxiliary electrode, 0.1M of tetrabutylammonium perchloride solution (in acetonitrile) served as an electrolyte. The UV-VIS-NIR spectrum of the sample in the quartz cell was simultaneously detected by Agilent 8453 UV-VIS spectrometer and Hitachi U-4100 UV-VIS-NIR spectrometer, as shown in FIG. 3E. The film of the transparent electrochromic polymer (Formula 35) was supplied with a voltage from +0.00V to +1.40V, such that the appearance of the film was transferred from transparent colorless (+0.00V) to yellow-green (+0.48V), blue (+0.92V), deep blue (+1.10V), and deep purple (+1.40V). Because the p-phenylenediamine had two oxidation active sites (two nitrogen atoms), all of the first, second, third, and fourth oxidation-reducing peaks had a reversibility over 96%. Accordingly, the aromatic diamine with strong electron-donating groups could further stabilize the cationic free radical formed by oxidation, thereby having excellent electrochemical properties. As shown in the spectroelectrochemical spectrum of FIG. 3E, the film of the original neutral state was completely free of absorption in the visible region. The film was semi-oxidized to be yellow-green and fully-oxidized to be deep purple. The diamine had two oxidation active sites that could react with the epoxy compound to further have two additional oxidation active sites, thereby having a multicolor change property. The color of the thin film composed of the single material could be changed by controlling the voltage.

The film of Formula 35 was copolymerized of the diamine and the cycloaliphatic epoxy compound. Compared to the films of Formulae 31 to 33, the film of Formula 35 had a higher transmittance at zero oxidation state and similar color change active sites, such that the film of Formula 35 had a higher contrast.

TABLE 4

| Example | Transmittance of the film for the light with a $\lambda_{375\,nm}$ (%) | Oxidation potential (V)[a] | | | | |
|---|---|---|---|---|---|---|
| | | $E_{onset}$ | $E_{1/2\ (first\ oxidation\ state)}$ | $E_{1/2\ (second\ oxidation\ state)}$ | $E_{p\ (third\ oxidation\ state)}$[b] | $E_{p\ (fourth\ oxidation\ state)}$[b] |
| Example 9 (Formula 34) | 85.7 | 0.19 | 0.30 | 0.58 | 1.74 | — |
| Example 10 (Formula 35) | 72.2 | 0.18 | 0.30 | 0.51 | 0.91[c] | 1.16[c] |

[a]Cyclic voltammetry with a reference electrode of Ag/AgCl in CH$_3$CN.
[b]Electrical potential peak of the irreversible step.
[c]Confirmed by differential-pulse voltammetry (DPV).

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A transparent electrochromic polymer, being polymerized of 1 molar part of a diamine and 1 to 4 molar parts of an epoxy compound,
wherein the diamine is Formula 1, Formula 2, or a combination thereof:

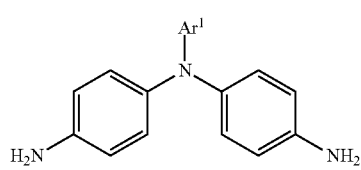

(Formula 1)

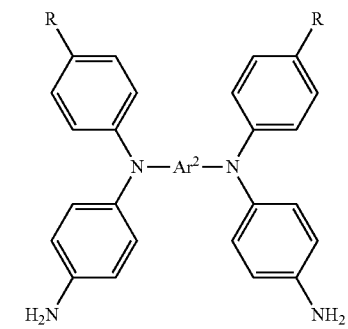

(Formula 2)

Ar$^1$ is Formula 3, Formula 4, Formula 5, Formula 6, Formula 7, or Formula 8:

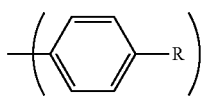

(Formula 3)

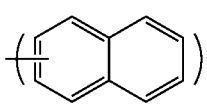

(Formula 4)

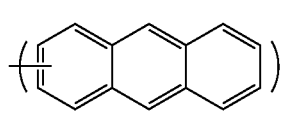

(Formula 5)

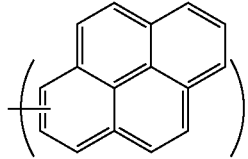

(Formula 6)

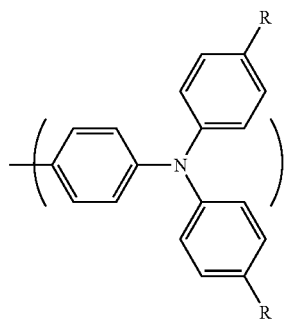

(Formula 7)

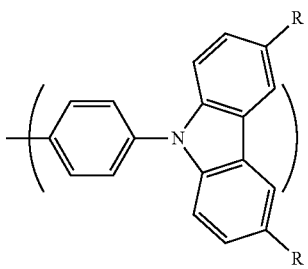

(Formula 8)

R is —H, —F, —Br, —Cl, —I, —CH$_3$, —C$_2$H$_5$, —C$_3$H$_7$, -n-C$_4$H$_9$, -s-C$_4$H$_9$, -t-C$_4$H$_9$, —C$_5$H$_{11}$, —C$_6$H$_{13}$, —C$_7$H$_{15}$, —OCH$_3$, —OC$_2$H$_5$, —OC$_3$H$_7$, -n-OC$_4$H$_9$, -s-OC$_4$H$_9$, -t-OC$_4$H$_9$, —OC$_5$H$_{11}$, —OC$_6$H$_{13}$, or —OC$_7$H$_{15}$;

Ar$^2$ is Formula 9, Formula 10, or Formula 11:

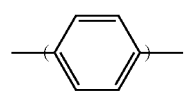

(Formula 9)

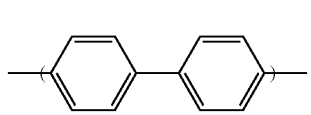

(Formula 10)

(Formula 11)

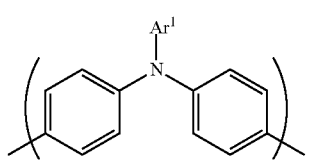

wherein the epoxy compound is Formula 12, Formula 13, or a combination thereof:

(Formula 12)

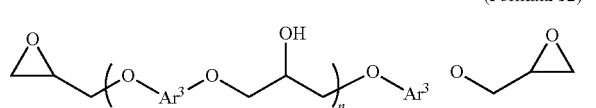

(Formula 13)

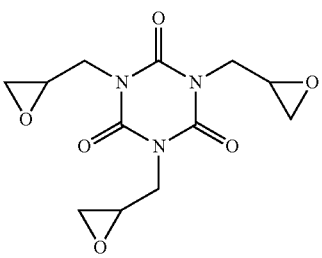

n is between 0 to 100, and $Ar^3$ is Formula 9, Formula 14, Formula 15, Formula 16, Formula 17, Formula 18, Formula 19, Formula 20, Formula 21, or Formula 22:

(Formula 9)

(Formula 14)

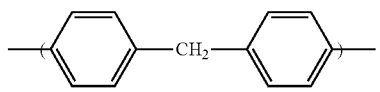

(Formula 15)

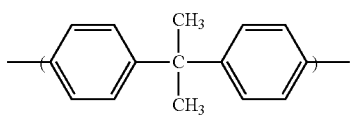

(Formula 16)

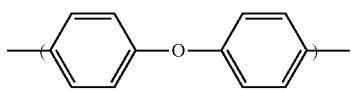

(Formula 17)

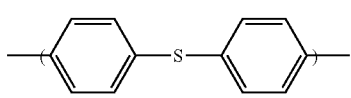

(Formula 18)

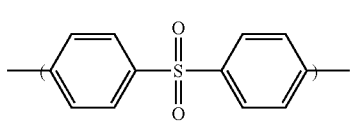

(Formula 19)

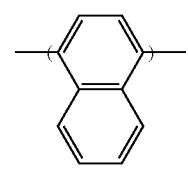

(Formula 20)

(Formula 21)

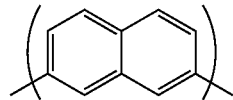

(Formula 22)

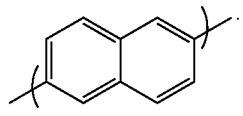

2. The transparent electrochromic polymer as claimed in claim 1, being Formula 23:

(Formula 23)

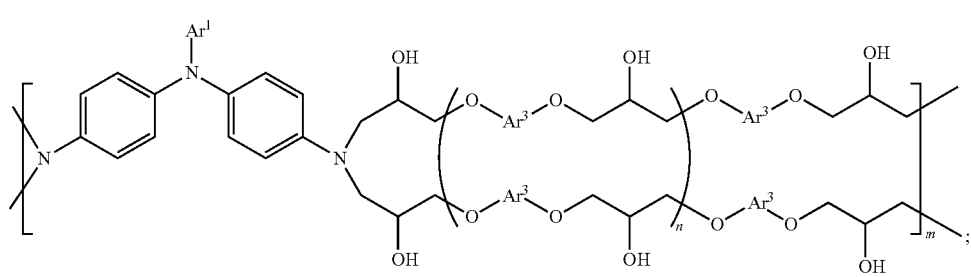

wherein m is between 1 to 300.

3. The transparent electrochromic polymer as claimed in claim 1, being Formula 24:
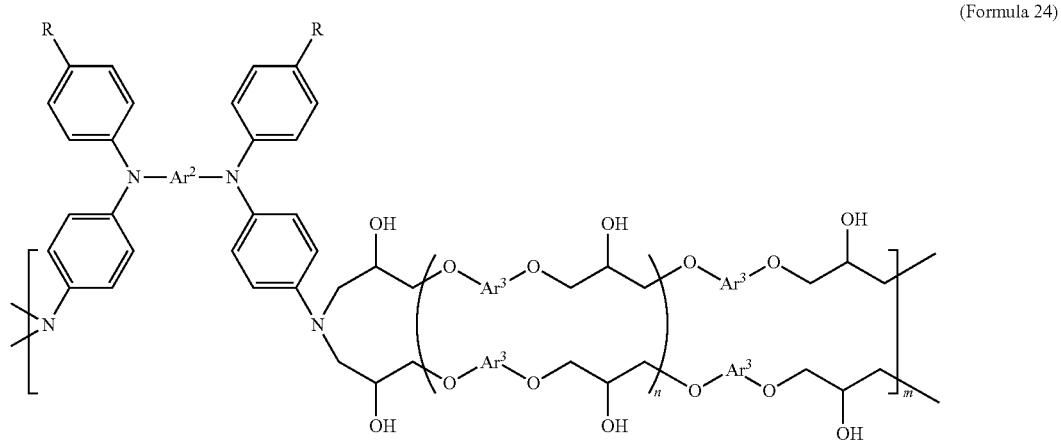
(Formula 24)
wherein m is between 1 to 300.
4. The transparent electrochromic polymer as claimed in claim 1, being Formula 25:
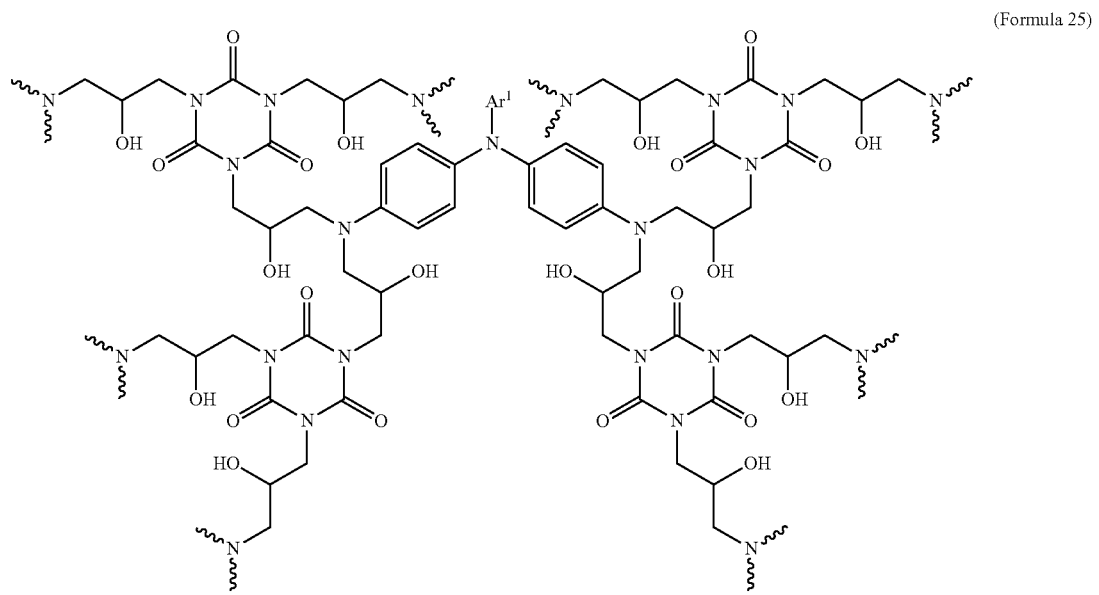
(Formula 25)
wherein N~~~ is a ring opening part of a reaction of an amino group and an epoxy group.

5. The transparent electrochromic polymer as claimed in claim 1, being Formula 26:
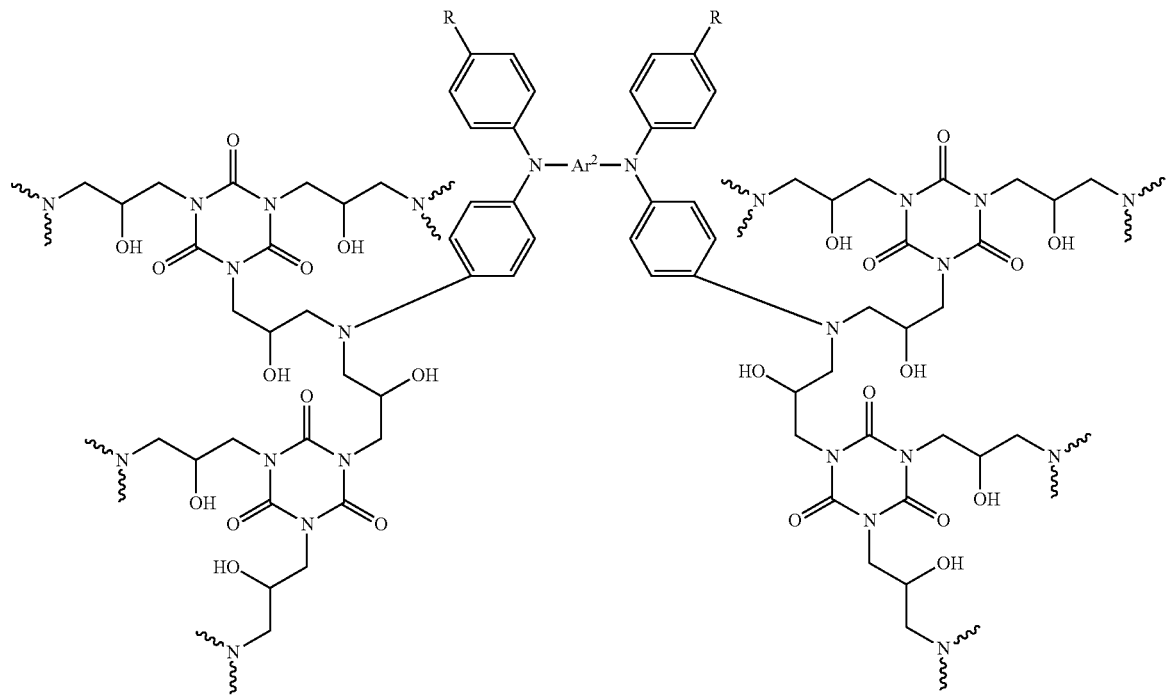
(Formula 26)
wherein N~~~ is a ring opening part of a reaction of an amino group and an epoxy group.
6. The transparent electrochromic polymer as claimed in claim 1, wherein the diamine is Formula 27, and the epoxy compound is Formula 28:
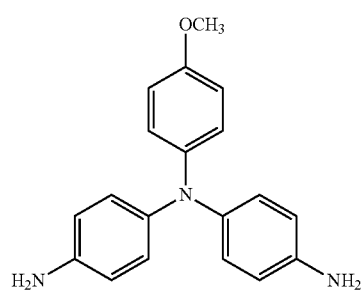
(Formula 27)
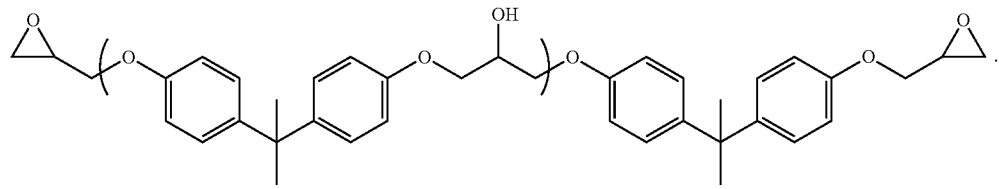
(Formula 28)

7. The transparent electrochromic polymer as claimed in claim 1, wherein the diamine is Formula 29, and the epoxy compound is Formula 28:
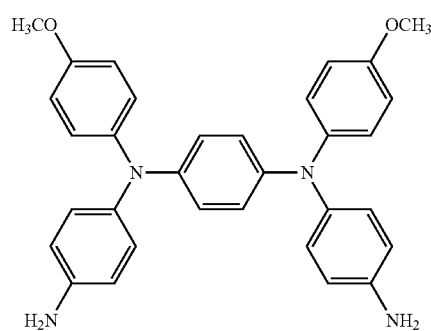
(Formula 29)
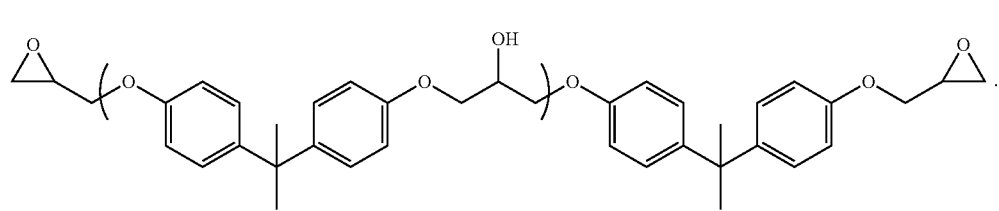
(Formula 28)
8. The transparent electrochromic polymer as claimed in claim 1, wherein the diamine is Formula 30, and the epoxy compound is Formula 28:
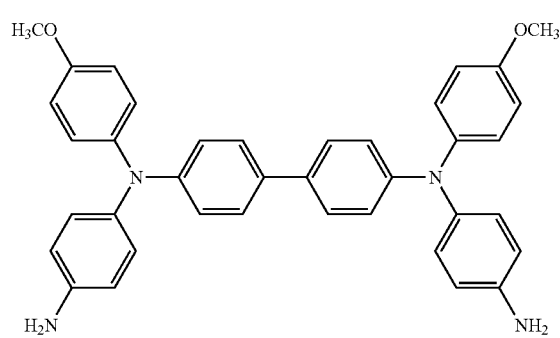
(Formula 30)
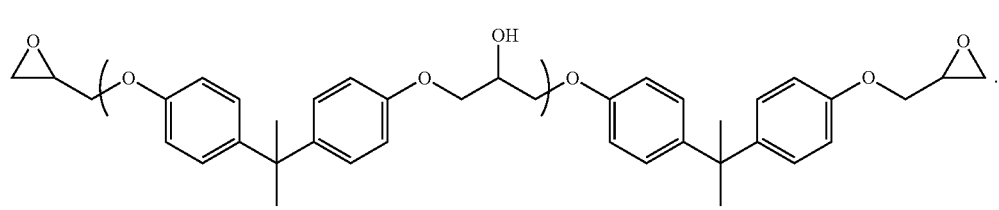
(Formula 28)

9. The transparent electrochromic polymer as claimed in claim 1, wherein the diamine is Formula 27, and the epoxy compound is Formula 13:

(Formula 27)
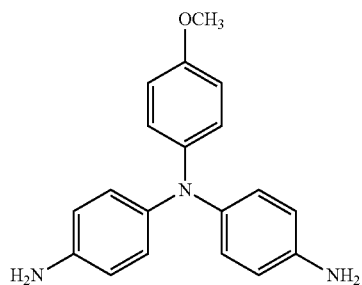

(Formula 13)
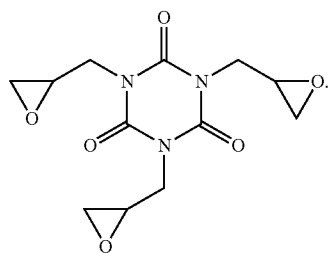

10. The transparent electrochromic polymer as claimed in claim 1, wherein the diamine is Formula 29, and the epoxy compound is Formula 13:

(Formula 29)
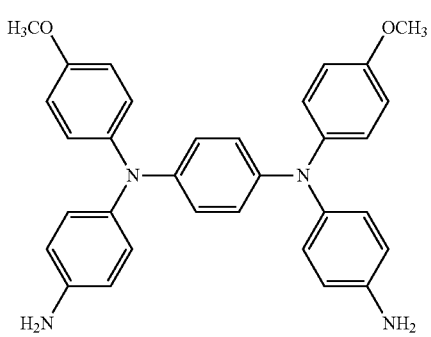

(Formula 13)
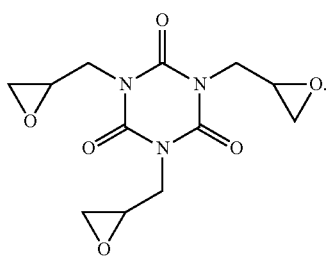

11. The transparent electrochromic polymer as claimed in claim 1, having a weight average molecular weight of 1,000 to 300,000.

12. An electrochromic device, comprising:
a first transparent conductive layer;
a layer of the transparent electrochromic polymer as claimed in claim 1 disposed on the first transparent conductive layer;
an electrolyte layer disposed on the layer of the transparent electrochromic polymer;
and
a second transparent conductive layer disposed on the electrolyte layer.

* * * * *